United States Patent
Kwon et al.

(10) Patent No.: US 10,945,250 B2
(45) Date of Patent: Mar. 9, 2021

(54) WIRELESS COMMUNICATION APPARATUS FOR SUPPORTING A PLURALITY OF RADIO ACCESS TECHNOLOGIES AND WIRELESS COMMUNICATION METHOD THEREOF

(71) Applicant: Samsung Electronics Co., Ltd., Suwon-si (KR)

(72) Inventors: Yang-soo Kwon, Seoul (KR); Min-goo Kim, Hwaseong-si (KR); In-hyoung Kim, Yongin-si (KR); Joo-hyun Do, Seoul (KR); Su-young Park, Uiwang-si (KR); Su-ha Yoon, Yongin-si (KR); Eui-chang Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 69 days.

(21) Appl. No.: 15/992,820

(22) Filed: May 30, 2018

(65) Prior Publication Data
US 2018/0376462 A1    Dec. 27, 2018

(30) Foreign Application Priority Data

Jun. 23, 2017    (KR) .................. 10-2017-0079956
Nov. 14, 2017    (KR) .................. 10-2017-0151721

(51) Int. Cl.
| | |
|---|---|
| *H04W 72/04* | (2009.01) |
| *H04W 4/06* | (2009.01) |
| *H04W 56/00* | (2009.01) |
| *H04W 72/12* | (2009.01) |
| *H04W 88/06* | (2009.01) |
| *H04L 12/18* | (2006.01) |

(52) U.S. Cl.
CPC .......... *H04W 72/042* (2013.01); *H04W 4/06* (2013.01); *H04W 56/001* (2013.01); *H04W 72/0453* (2013.01); *H04W 72/1268* (2013.01); *H04L 12/189* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,625,474 B2 | 1/2014 | Krishnamoorthi et al. | |
| 8,995,359 B2 | 3/2015 | Dayal et al. | |
| 9,167,622 B2 | 10/2015 | Homchaudhuri et al. | |
| 9,578,558 B2 * | 2/2017 | Seo | H04W 36/0072 |

(Continued)

FOREIGN PATENT DOCUMENTS

| | | |
|---|---|---|
| JP | 4626855 | 2/2011 |
| KR | 10-2017-0009303 | 1/2017 |

*Primary Examiner* — James P Duffy
(74) *Attorney, Agent, or Firm* — Harness, Dickey & Pierce, P.L.C.

(57) ABSTRACT

A wireless communication method of a wireless communication apparatus for supporting a plurality of radio access technologies (RATs) including receiving a first downlink signal corresponding to a first RAT and a second downlink signal corresponding to a second RAT from a base station through a first frequency band, decoding the first downlink signal, detecting the second downlink signal based on a result of decoding of the first downlink signal, and decoding the detected second downlink signal to acquire data included in the second downlink signal may be provided.

15 Claims, 19 Drawing Sheets

(56) References Cited

U.S. PATENT DOCUMENTS

| | | |
|---|---|---|
| 9,609,666 B2 | 3/2017 | Sun et al. |
| 2008/0152031 A1* | 6/2008 | Lee .................. H04W 72/0413 375/260 |
| 2014/0287753 A1* | 9/2014 | Schulist ............ H04W 36/0022 455/436 |
| 2015/0188650 A1 | 7/2015 | Au et al. |
| 2016/0037544 A1 | 2/2016 | Wang |
| 2016/0135143 A1* | 5/2016 | Won .................... H04W 72/005 370/312 |
| 2016/0192295 A1 | 6/2016 | Son et al. |
| 2016/0380689 A1 | 12/2016 | Sun et al. |
| 2017/0047975 A1 | 2/2017 | Lee et al. |
| 2017/0055248 A1 | 2/2017 | Moon et al. |
| 2018/0367985 A1* | 12/2018 | Novlan .................. H04W 8/22 |

\* cited by examiner

WIRELESS COMMUNICATION APPARATUS FOR SUPPORTING A PLURALITY OF RADIO ACCESS TECHNOLOGIES AND WIRELESS COMMUNICATION METHOD THEREOF

CROSS-REFERENCE TO RELATED APPLICATIONS

This application claims priority under 35 U.S.C. § 119 to Korean Patent Application Nos. 10-2017-0079956, filed on Jun. 23, 2017 and 10-2017-0151721, filed on Nov. 14, 2017, in the Korean Intellectual Property Office, the disclosures of which are incorporated herein in their entirety by reference.

BACKGROUND

The inventive concepts relate to wireless communications, and more particularly, to wireless communication apparatuses for supporting a plurality of radio access technologies (RATs) and/or wireless communication methods thereof.

As communication technologies continue to develop, research into $4^{th}$ generation (4G) communication technology (e.g., long term evolution (LTE) communication technology), and $5^{th}$ generation (5G) communication technology, have been carried out. In order to increase user convenience and to provide efficient communication through an existing compatible communication infrastructure, wireless communication terminals supporting existing 4G RATs as well as emerging 5G radio access technologies (RATs) are being desired.

SUMMARY

The inventive concepts provide wireless communication apparatuses which support a plurality of radio access technologies (RATs) to improve user convenience and communication efficiency, and/or wireless communication methods thereof.

According to an aspect of the inventive concepts, a wireless communication method of a wireless communication apparatus for supporting a plurality of radio access technologies (RATs) may include receiving a first downlink signal corresponding to a first RAT and a second downlink signal corresponding to a second RAT from a base station through a first frequency band, decoding the first downlink signal, detecting the second downlink signal based on a result of decoding of the first downlink signal, and decoding the detected second downlink signal to acquire data included in the second downlink signal.

According to another aspect of the inventive concepts, a wireless communication method may include receiving a first downlink signal from a base station through a first frequency band, the first downlink signal corresponding to a first radio access technology (RAT), the first frequency band being a frequency band allocated for transmission of a second downlink signal corresponding to a second RAT, performing synchronization with the base station by acquiring synchronization signal (SS) burst from the first downlink signal, acquiring an upper layer signal included in the first downlink signal after the synchronization is completed, acquiring system information about a target slot based on the upper layer signal, detecting the first downlink signal from the target slot, and decoding the detected first downlink signal to acquire data included in the first downlink signal.

According to another aspect of the inventive concepts, a wireless communication apparatus may include a radio frequency (RF) circuit configured to receive a downlink signal, the downlink signal including at least one of a first downlink signal corresponding to a first radio access technology (RAT) or a second downlink signal corresponding to a second RAT through a first frequency band, a first baseband processor configured to process the first downlink signal, and a second baseband processor configured to process the second downlink signal, the second baseband processor further configured to perform an operation based on a result of decoding the first downlink signal of the first baseband processor.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1A:
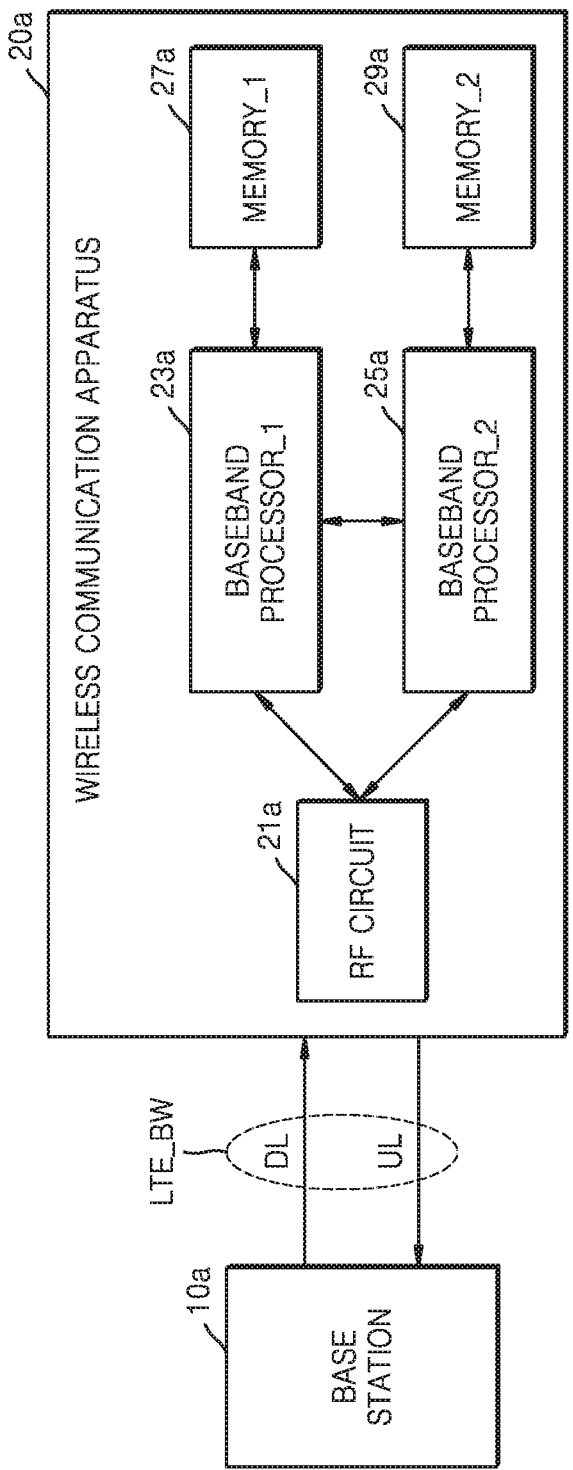
FIG. 1A is a schematic block diagram of a wireless communication system according to an example embodiment of the inventive concepts.

FIG. 1A is a schematic block diagram of a wireless communication system 1a according to an example embodiment of the inventive concepts.

The wireless communication system 1a may be a long term evolution (LTE) system, a $5^{th}$ generation (5G) system, a code division multiple access (CDMA) system, a global system for mobile communications (GSM) system, a wireless local area network (WLAN) system, or another arbitrary wireless communication system as a non-limiting example. Hereinafter, the wireless communication system 1a will be described mainly with reference to an LTE system and a 5G system. However, example embodiments of the inventive concepts are not limited thereto.

A base station (BS) 10a may refer to a fixed station that communicates with a user device and/or another BS and may communicate with the user device and/or another BS for exchanging data and control information. For example, the BS 10a may also be referred to as Node-B, evolved-Node B (eNB), a sector, a site, a base transceiver system (BTS), an access point (AP), a relay node, a remote radio head (RRH), a radio unit (RU), or a small cell, etc. In the present specification, the BS 10a or cell may be interpreted in a comprehensive meaning indicating a portion of a region or function covered by a base station controller (BSC) in CDMA, Node-B of WCDMA, eNB or sector (site) in LTE and may include all of various communication coverage regions, such as a mega-cell, a macro-cell, a pico-cell, a femto-cell, and a relay node, an RRH, an RU, and a small cell.

A wireless communication apparatus 20a may refer to user equipment (UE), and may be fixed or be mobile. The wireless communication apparatus 20a may refer to various devices that may transmit/receive data and/or control information by communicating with the BS 10a. For example, the wireless communication apparatus 20a may be referred to as terminal equipment, a mobile station (MS), a mobile terminal (MT), a user terminal (UT), a synchronization signal (SS), a wireless device, or a handheld device.

A wireless communication network between the wireless communication apparatus 20a and the BS 10a may share available network resources. For example, in the wireless communication network, information may be transmitted using various multiple access methods, such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, OFDM-CDMA, and the like.

Referring to FIG. 1A, the wireless communication system 1a may support a plurality of wireless access technologies. The wireless communication apparatus 20a may include a radio frequency (RF) circuit 21a, a first baseband processor 23a, a second baseband processor 25a, a first memory 27a, and a second memory 29a. Hereinafter, it is assumed that the first baseband processor 23a supports an LTE radio access technology (RAT) and the second baseband processor 25a supports 5G wireless access technology. However, this is just an example embodiment. Thus, example embodiments are not limited thereto, and the first baseband processor 23a and the second baseband processor 25a may support different wireless access technologies.

The wireless communication apparatus 20a and the BS 10a may communicate with each other via an uplink (UL) and a downlink (DL). The uplink and the downlink in an LTE system, an LTE-Advanced system, or a 5G system may transmit control information via a control channel (e.g., a physical downlink control channel (PDCCH), a physical control format indicator channel (PCFICH), a physical hybrid ARQ indicator channel (PHICH), a physical uplink control channel (PUCCH), or an enhanced physical downlink control channel (EPDCCH), and may transmit data via a data channel (e.g., a physical downlink shared channel (PDSCH) or a physical uplink shared channel (PUSCH)).

The wireless communication apparatus 20a may receive a downlink signal including at least one of a first downlink signal or a second downlink signal from the BS 10a via the downlink within an LTE frequency band LTE_BW. Hereinafter, it is assumed that the first downlink signal is a signal processed based on the LTE RAT using the first baseband processor 23a and the second downlink signal is a signal processed based on the 5G RAT using the second baseband processor 25a. Also, the wireless communication apparatus 20a may transmit an uplink signal including at least one of a first uplink signal or a second uplink signal to the BS 10a via the uplink within the LTE frequency band LTE_BW. Hereinafter, it is assumed that the first uplink signal is a signal processed based on the LTE RAT using the first baseband processor 23a and the second uplink signal is a signal processed based on the 5G RAT using the second baseband processor 25a.

The RF circuit 21a may receive a downlink signal from the BS 10a via a plurality of antennas or may transmit an uplink signal to the BS 10a. The RF circuit 21a may include an analog down-conversion mixer and may down-convert a frequency of the received downlink signal using the analog down-conversion mixer to generate a baseband signal. Also, the RF circuit 21a may further include an analog-digital converter to perform a processing operation of converting the baseband signal into a digital signal.

In an example embodiment, the first baseband processor 23a may perform LTE wireless communication with the BS 10a. Thus, the first baseband processor 23a may decode the first downlink signal received from the RF circuit 21a to acquire data included in the first downlink signal. When the first baseband processor 23a receives a second downlink signal for 5G wireless communications from the BS 10a via the LTE frequency band LTE_BW while performing LTE wireless communications, an operation of the second baseband processor 25a may be desired. Thus, the first baseband processor 23a may generate a support signal for supporting the operation of the second baseband processor 25a based on the result of decoding of the first downlink signal. The support signal may include information indicating whether the second downlink signal is included in the downlink signal received from the BS 10a. The second baseband processor 25a may perform 5G wireless communications based on the support signal. That is, the second baseband processor 25a may determine whether to detect the second downlink signal based on the support signal, and may detect the second downlink signal. The second baseband processor 25a may decode the detected second downlink signal to acquire data included in the second downlink signal.

In some example embodiments, when the second baseband processor 25a receives the first downlink signal for performing LTE wireless communications from the BS 10a via the LTE frequency band LTE_BW while performing 5G wireless communications with the BS 10a via the LTE frequency band LTE_BW or a 5G frequency band (not shown), an operation of the first baseband processor 23a may be desired. Thus, the second baseband processor 25a may generate a support signal for supporting the operation of the first baseband processor 23a based on a decoding result of the second downlink signal. The first baseband processor 23a may determine whether to detect the first downlink signal based on the support signal, and may detect the first downlink signal to perform LTE wireless communications.

The first memory 27a may store all information about LTE wireless communications of the first baseband processor 23a. In an example embodiment, the first memory 27a may store at least one of LTE-based synchronization information with a base station to which the LTE RAT is applied or an LTE-based upper layer signal. The upper layer signal described below may include system information that is transmitted from the base station to wireless communication apparatuses in a wireless communication network. The system information, which is information repeatedly broadcasted within the wireless communication network, may refer to information desired for the wireless communication apparatus 20a to have access to the BS 10a. For example, the LTE-based upper layer signal may include multicast broadcast single-frequency network (MBSFN) configuration information indicating a position of an MBSFN sub-frame. Also, a 5G-based upper layer signal described below may include valid slot-related configuration information. The LTE-based upper layer signal or the 5G-based upper layer signal may be transmitted to the wireless communication apparatus 20a from the BS 10a via the LTE frequency band LTE_BW by performing radio resource control (RRC) signaling.

The first baseband processor 23a may store all information about LTE wireless communications in the first memory 27a while being switched from an RRC-connected state to an RRC idle state or a power-off state. Subsequently, the first baseband processor 23a may perform RRC connection or RRC reconfiguration using the information about LTE wireless communications stored in the first memory 27a.

The second memory 29a may store all information about 5G wireless communications of the second baseband processor 25a. In an example embodiment, the second memory 29a may store at least one of 5G-based synchronization information with the BS to which the 5G RAT is applied or a 5G-based upper layer signal. The second baseband processor 25a may store all information about 5G wireless communications in the second memory 29a while being switched from the RRC-connected state to the RRC idle state or power-off. Subsequently, the second baseband processor 25a may RRC connection or RRC reconfiguration using all information about 5G wireless communications stored in the second memory 29a.

Baseband processors 23a and 25a included in the wireless communication apparatus 20a according to the present example embodiment of the inventive concepts may decode downlink signals corresponding to heterogeneous RATs, and generate support signals based on the result of decoding of corresponding downlink signals to provide the support signals to each other so that a plurality of RATs may be efficiently supported. Thus, the wireless communication apparatus 20a may provide various communication services to the user so that user convenience may be improved and a limited frequency band may be efficiently used.

Figure 1B:
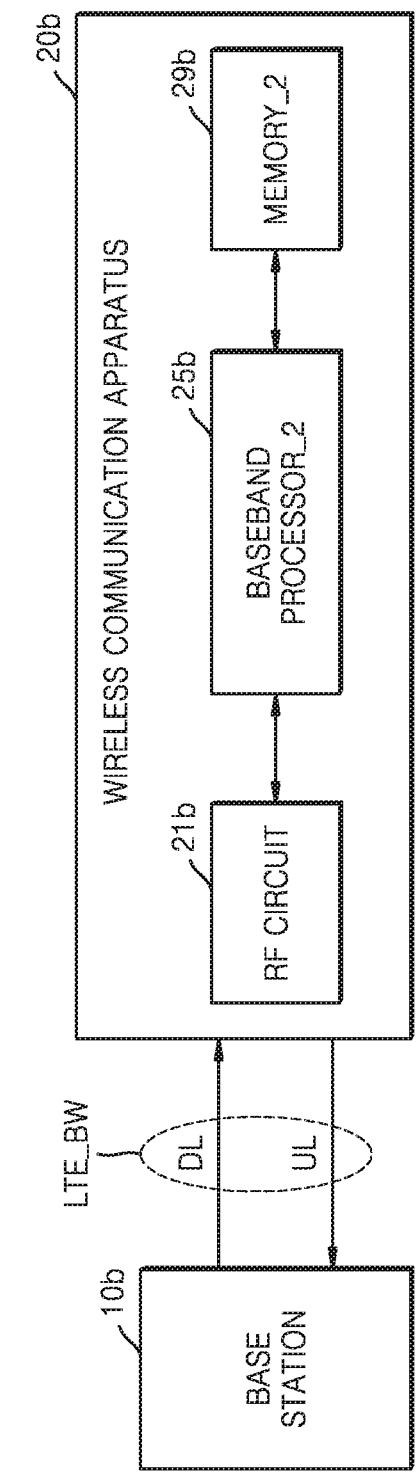
FIG. 1B is a schematic block diagram of a wireless communication system according to an example embodiment of the inventive concepts.

FIG. 1B is a schematic block diagram of a wireless communication system 1b according to an example embodiment of the inventive concepts.

Referring to FIG. 1B, the wireless communication system 1b may include a base BS 10b and a wireless communication apparatus 20b. Unlike the wireless communication apparatus 20a of FIG. 1A, the wireless communication apparatus 20b may include only a second baseband processor 25b for supporting a 5G RAT. In an example embodiment, the wireless communication apparatus 20b may receive a second downlink signal from the BS 10b via an LTE frequency band LTE_BW. The second downlink signal may include a synchronization signal that may be processed by the second baseband processor 25b. In an example embodiment, the second downlink signal may further include valid slot-related information. A description of the valid slot-related information will be provided with reference to FIG. 11.

The second baseband processor 25b may detect the second downlink signal received via the LTE frequency band LTE_BW based on the synchronization signal. For example, the second baseband processor 25b may perform synchronization with the BS 10b using the synchronization signal, and may decode a PDCCH of the second downlink signal using the valid slot-related information included in the second downlink signal after synchronization is completed. The second baseband processor 25b may acquire data included in the second downlink signal based on the result of decoding.

Also, the second baseband processor 25b may request scheduling at the BS 10b to transmit data via an uplink UL within the LTE frequency band LTE_BW, and when uplink scheduling is approved, the second baseband processor 25b may transmit the data to the BS 10b based on 5G.

Figure 2A:
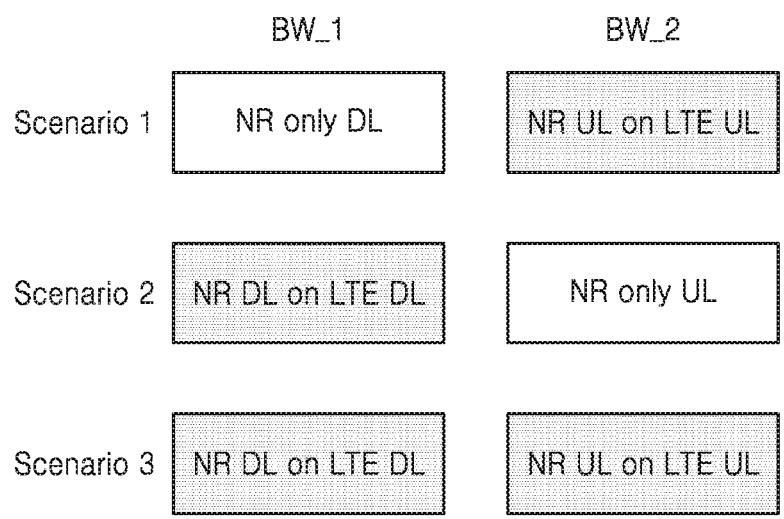
FIG. 2A is a view of a scenario in a frequency band in which long term evolution (LTE) wireless communications and 5th generation (5G) wireless communications may be performed, according to an example embodiment of the inventive concepts.
Figure 2B:
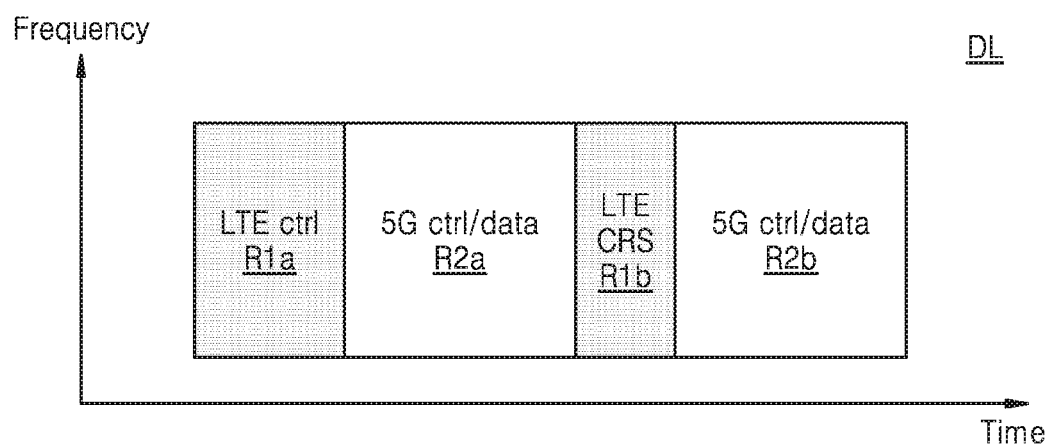
FIGS. 2B and 2C are views of positions of the arrangement of a first downlink signal and a second downlink signal.
Figure 2C:
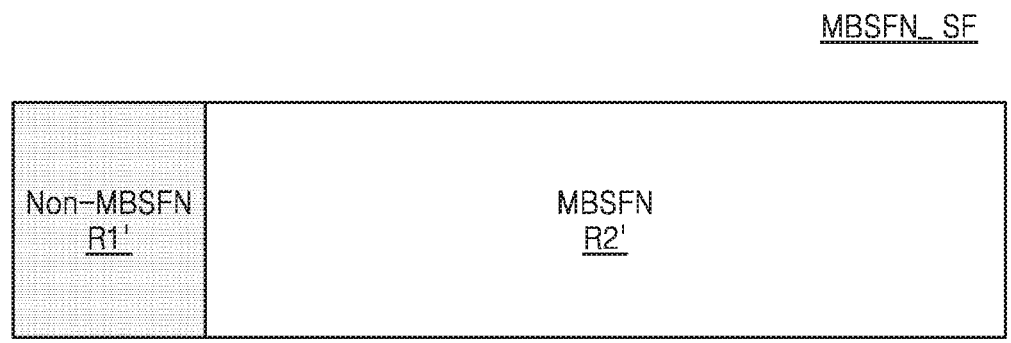

FIG. 2A is a view of a scenario in a frequency band in which LTE wireless communications and 5G wireless communications may be performed, according to an example embodiment of the inventive concepts, and FIGS. 2B and 2C are views of positions of the arrangement of a first downlink signal and a second downlink signal.

Referring to FIG. 2A, a wireless communication system may perform only 5G New Radio (NR)-based downlink wireless communications using a first frequency band BW_1, and may perform LTE-based uplink wireless communications and 5G NR-based uplink wireless communications using a second frequency band BW_2 at Scenario 1. The wireless communication system may perform LTE-based downlink communications and 5G NR-based downlink wireless communications using the first frequency band BW_1, and may perform only 5G NR-based uplink wireless communications using the second frequency band BW_2, at Scenario 2. The wireless communication system may perform LTE-based downlink communications and 5G NR-based downlink wireless communications using the first frequency band BW_1, and may perform LTE-based uplink communications and 5G NR-based uplink wireless communications using the second frequency band BW_2 at Scenario 3.

Referring to FIG. 2B, the base station may transmit a first downlink signal corresponding to an LTE RAT and a second downlink signal corresponding to a 5G RAT to a wireless communication apparatus. The downlink may include an LTE control signal region R1a, an LTE cell specific reference signal (CRS) region R1b, and 5G control signal/data regions R2a and R2b. In an example embodiment, the LTE control signal region R1a, the LTE CRS region R1b, and the 5G control/signal data regions R2a and R2b may be classified according to a time domain multiplexing (TDM) method. Signals arranged in the LTE control signal region R1a and the LTE CRS region R1b may be first downlink signals, and signals arranged in the 5G control signal/data regions R2a and R2b may be second downlink signals. In an example embodiment, the first downlink signals may include signals, such as physical broadcasting channel (PBCH) signals, primary synchronization signals (PSSs), secondary synchronization signals (SSSs), system information block (SIB) signals, physical downlink control channel (PDCCH) signals, and CRSs. The second downlink signals may be arranged in the remaining regions R2a and R2b except for the regions R1a and R1b in which the first downlink signals of the downlink are arranged.

Referring to FIG. 2C, an MBSFN sub-frame MBSFN_SF among sub-frames of the downlink may include a non-MBSFN region (or a control region) R1' and an MBSFN region R2'. The MBSFN sub-frame MBSFN_SF may refer to a sub-frame in which data for an MBSFN may be arranged. Signals arranged in the non-MBSFN region R1' may be signals for performing the same function as that of signals of a general sub-frame. MBSFN-based multicast/broadcast transmission-related data may be arranged in the MBSFN region R2'. However, when the pieces of MBSFN-based multicast/broadcast transmission-related data are not arranged in the MBSFN region R2', for example, when a multicast (or broadcast) operation is not performed, second downlink signals including 5G control signals/data may be arranged in the MBSFN region R2'.

A description of performing downlink-based LTE wireless communications and 5G wireless communications using the signal arrangement form of FIGS. 2B and 2C will be described in more detail with reference to FIG. 5.

Figure 3A:
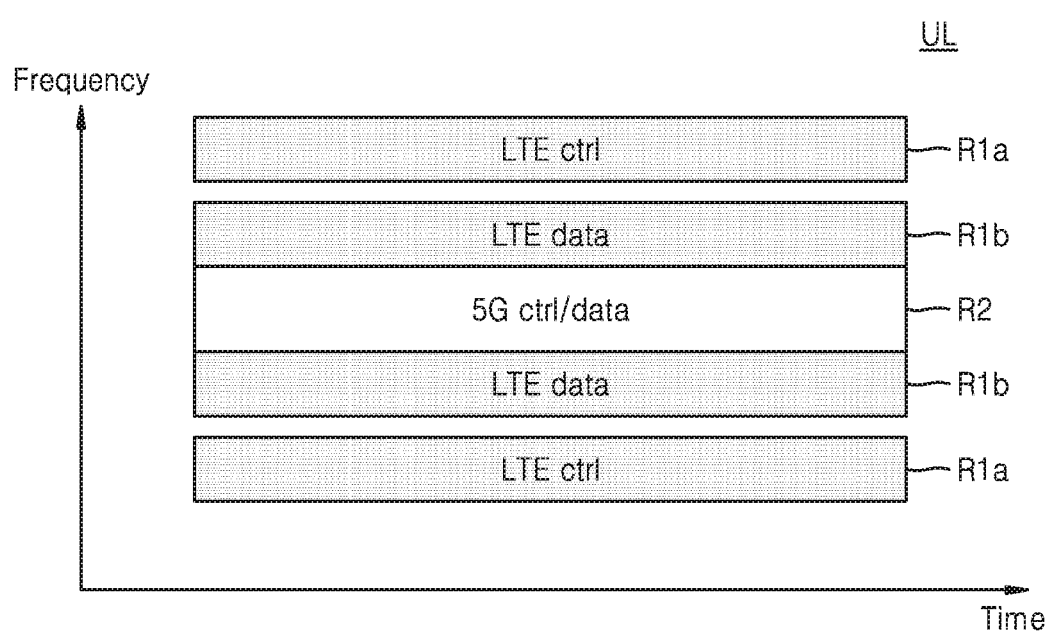
FIGS. 3A through 3C are views for explaining positional arrangements of a first uplink signal and a second uplink signal.
Figure 3B:
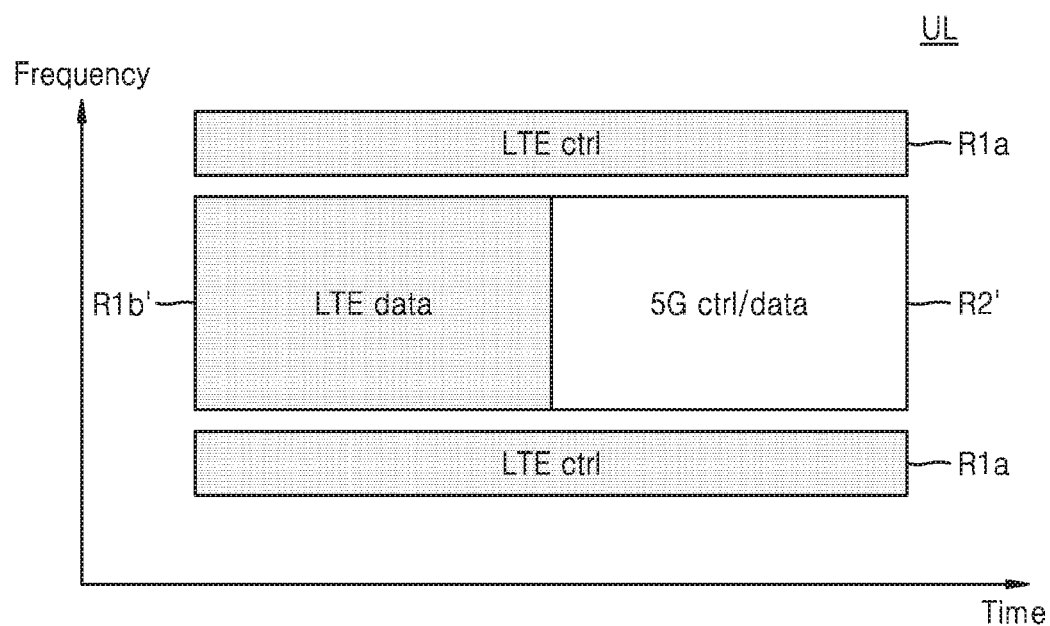
Figure 3C:
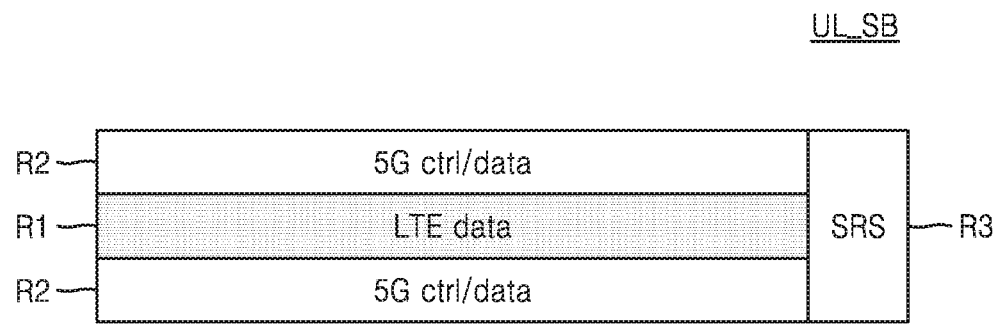

FIGS. 3A through 3C are views for explaining positional arrangements of a first uplink signal and a second uplink signal.

Referring to FIG. 3A, a wireless communication apparatus may transmit a first uplink signal corresponding to an LTE RAT and a second uplink signal corresponding to a 5G RAT to a base station (BS) via an uplink in an LTE frequency band. The uplink may include an LTE control signal region R1a, an LTE data region R1b, and a 5G control signal/data region R2. In an example embodiment, the LTE control signal region R1a, the LTE data region R1b, and the 5G control signal/data region R2 may be classified according to a frequency domain multiplexing (FDM) method, and may have different frequency bands. Signals arranged in the LTE control signal region R1a and the LTE data region R1b may be first uplink signals, and signals arranged in the 5G control signal/data region R2 may be second uplink signals.

Referring to FIG. 3B, the uplink may include an LTE control signal region R1a, an LTE data region R1b', and a 5G control signal/data region R2'. In an example embodiment, the LTE control signal region R1a and a group of the LTE data region R1b' and the 5G control signal/data region R2' may be classified according to an FDM method, and the LTE data region R1b' and the 5G control signal/data region R2' may be classified according to a TDM method.

Referring to FIG. 3C, a sub-frame UL_SB of the uplink may include an LTE data region R1, a 5G control signal/data region R2, and a sounding reference signal (SRS) region R3. SRSs may be arranged in the SRS region R3, and in a certain or predetermined symbol section corresponding to the SRS region R3, a wireless communication apparatus may not perform data transmission to a BS via a PUSCH. The 5G control signal/data region R2 may include the remaining region among the sub-frame UL_SB of the uplink (UP) except for the LTE data region R1 and the SRS region R3.

Figure 12:
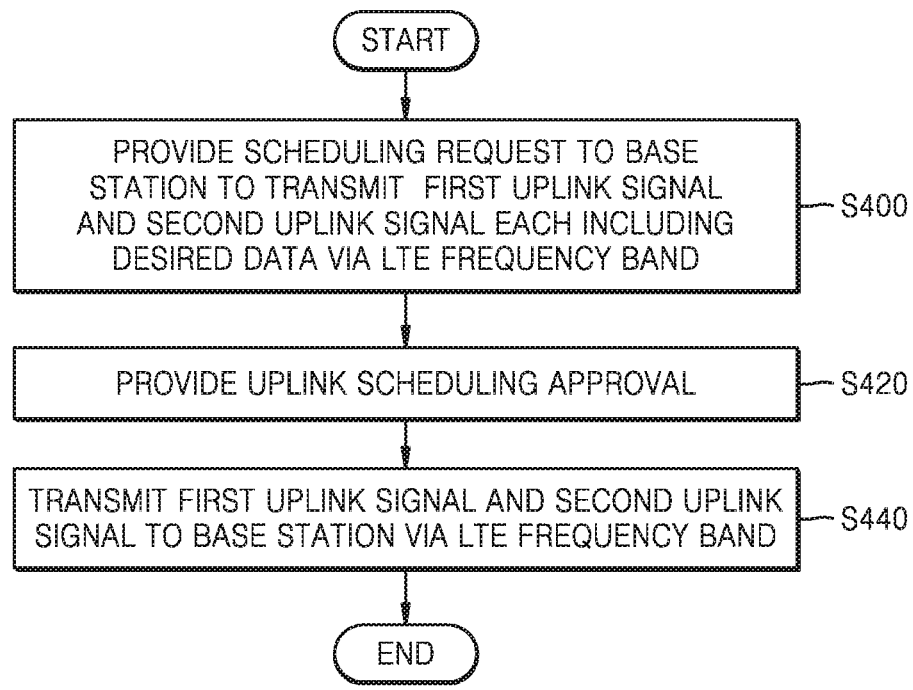
FIG. 12 is a flowchart illustrating an uplink-based wireless communication method for supporting a plurality of RATs, according to an example embodiment of the inventive concepts.

A description of performing an uplink-based LTE wireless communications and 5G wireless communications using the signal arrangements illustrated in FIGS. 3A through 3C will be provided in more detail with reference to FIG. 12.

Figure 4A:
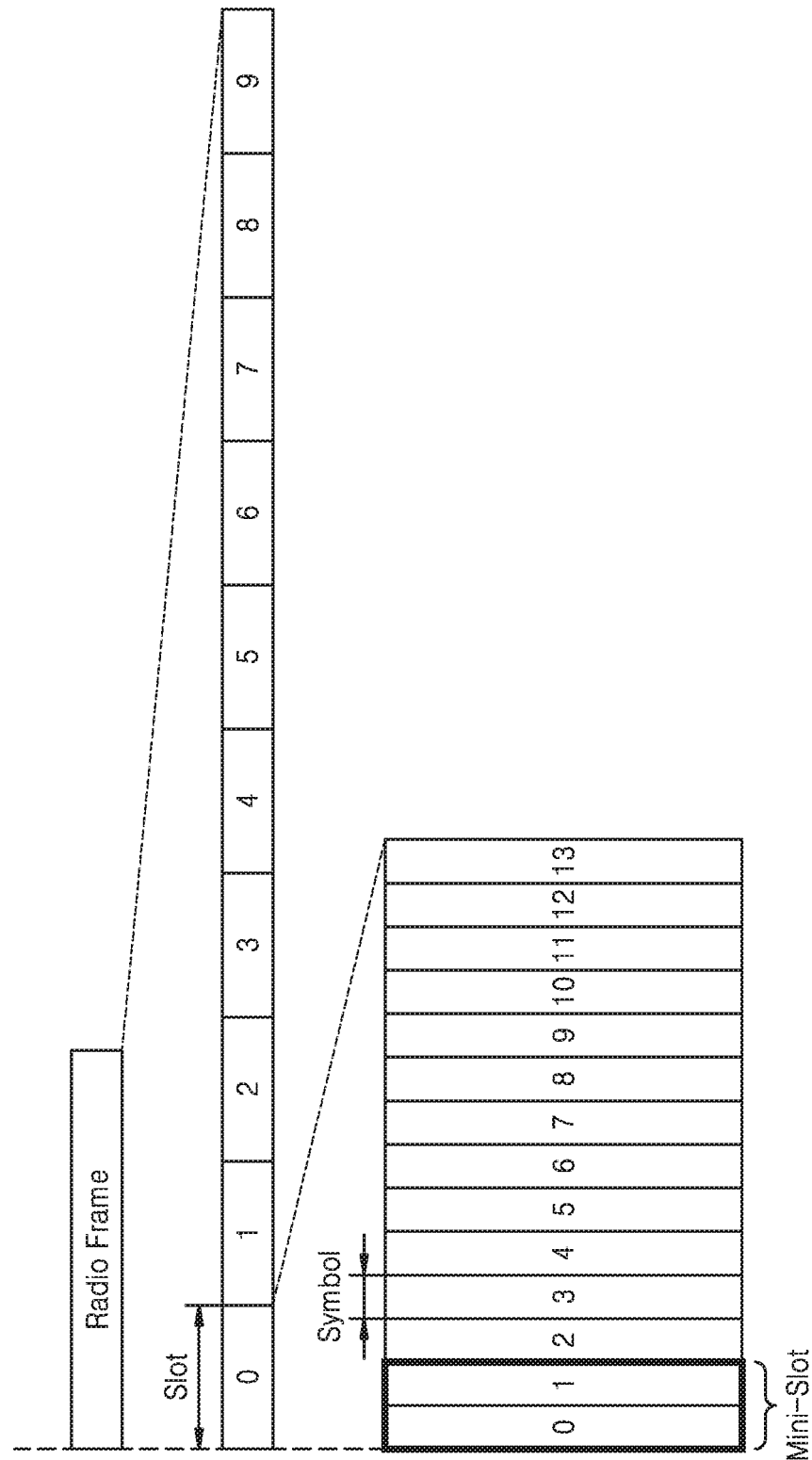
FIG. 4A is a view for explaining a configuration of a radio frame based on 5G.
Figure 4B:
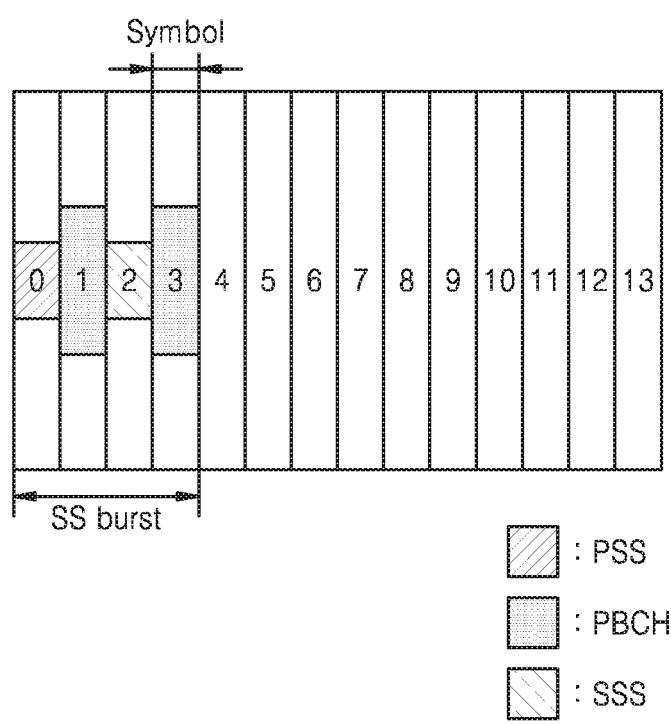
FIG. 4B is a view for explaining synchronization signal (SS) burst desired in performing synchronization based on 5G.

FIG. 4A is a view for explaining a configuration of a radio frame based on 5G, and FIG. 4B is a view for explaining SS burst desired in performing synchronization based on 5G.

Referring to FIG. 4A, one radio frame may include a plurality of slots. In an example, one radio frame may include 10 slots. One slot may include a plurality of symbols. In an example, one slot may include 14 symbols. However, this is just an example embodiment, and a slot may include a different number of symbols according to a unit interval between sub-carriers for 5G wireless communications, i.e., a sub-carrier spacing size. Also, at least one symbol included in one slot may be a mini-slot. The mini-slot may be defined as one unit for 5G-based low latency communications.

Referring to FIG. 4B, a desired (or alternatively, predetermined) slot may include SS burst desired to perform 5G-based synchronization. The SS burst may include a PSS, a PBCH, and an SSS. In an example embodiment, a wireless communication apparatus may firstly perform synchronization with a BS to perform 5G wireless communication, and may perform synchronization using the SS burst. For example, the wireless communication apparatus may check the position of a slot using the PSS and the SSS, and the wireless communication apparatus may receive system information desired to have access to a 5G-based network via the PBCH so that synchronization with the BS may be completed.

The configuration of the 5G-based radio frame and the configuration of the desired (or alternatively, predetermined) slot including the SS burst illustrated in FIGS. 4A and 4B may be applied to signals arranged in the 5G control signal/data region illustrated in FIGS. 2B, 2C, and 3A through 3C.

Figure 5:
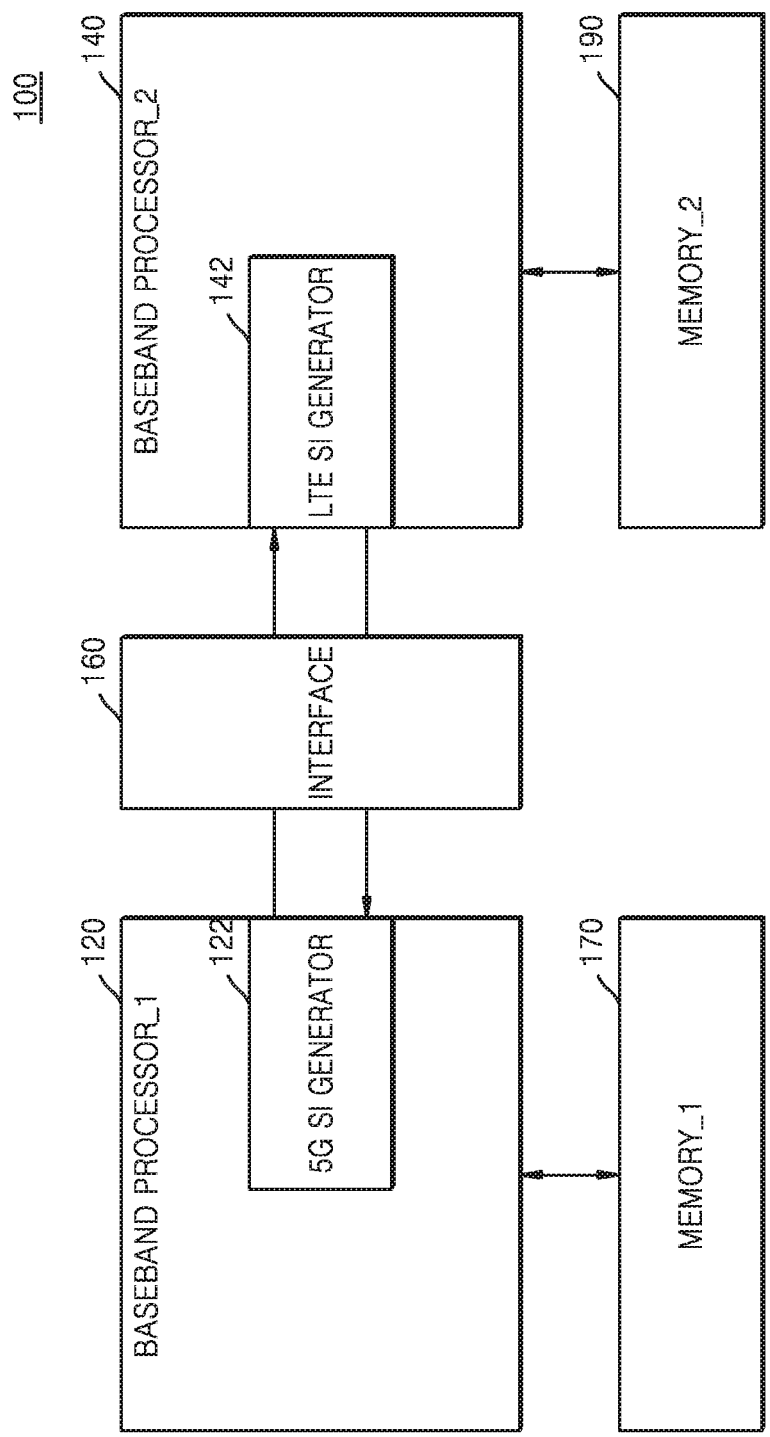
FIG. 5 is a block diagram of a wireless communication apparatus according to an example embodiment of the inventive concepts.

FIG. 5 is a block diagram of a wireless communication apparatus 100 according to an example embodiment of the inventive concepts.

Referring to FIG. 5, the wireless communication apparatus 100 may include a first baseband processor 120, a second baseband processor 140, an interface 160, a first memory 170, and a second memory 190. The first baseband processor 120 may include a 5G support signal generator 122, and the second baseband processor 140 may include an LTE support signal generator 142.

In an example embodiment, the first baseband processor 120 may decode a first downlink signal and may generate a 5G support signal based on the result of decoding to provide the 5G support signal to the second baseband processor 140 via the interface 160. The first baseband processor 120 may determine whether a second downlink signal is included in a downlink signal received via an LTE frequency band, based on the result of decoding.

In an example embodiment, if the result of decoding the first downlink signal indicates that multicast/broadcast traffic is not detected, second downlink signals including 5G control signal/data may be arranged in the MBSFN region R2' of FIG. 2C. Thus, the 5G support signal generator 122 may provide a 5G support signal so that the second baseband processor 140 may start detecting of the second downlink signals. In an example embodiment, if the result of decoding the first downlink signal indicates that multicast/broadcast traffic is detected, MBFSN-based multicast/broadcast transmission-related data may be arranged in the MBSFN region R2' of FIG. 2C. Thus, the 5G support signal generator 122 may provide a 5G support signal for performing power-off of the second baseband processor 140. The 5G support signal may include a signal desired for the second baseband processor 140 to detect the second downlink signal. In an example, the 5G support signal may include at least one of an LTE-based upper layer signal including position information of a sub-frame (e.g., position information of an MBSFN sub-frame) in which the second downlink signals may be arranged, or LTE-based synchronization information. The second baseband processor 140 may detect the second downlink signal based on the 5G support signal, and may decode the detected second downlink signal to acquire data included in the second downlink signal.

The first baseband processor 120 may be powered off when the second baseband processor 140 starts to perform an operation of detecting the second downlink signal. The first baseband processor 120 may store all information about LTE wireless communications in the first memory 170 before being powered off. Subsequently, the first baseband processor 120 may receive an LTE support signal from the second baseband processor 140, and may be powered on in response to the received LTE support signal. The first baseband processor 120 may read all information about LTE wireless communications from the first memory 170 to perform LTE wireless communications.

The second baseband processor 140 may decode the second downlink signal, and may generate an LTE support signal based on the result of decoding to provide the LTE support signal to the first baseband processor 120 via the interface 160. The second baseband processor 140 may determine whether the first downlink signal is included in the downlink signal received via the LTE frequency band, based on the result of decoding. In an example embodiment, the LTE support signal generator 142 may provide the LTE support signal so that the first baseband processor 120 starts detecting of the first downlink signal when the first downlink signal is included in the downlink signal received via the LTE frequency band. Also, the LTE support signal generator 142 may provide an LTE support signal for performing power-off of the first baseband processor 120 when the first downlink signal is not included in the downlink signal received via the LTE frequency band. The first baseband processor 120 may detect the first downlink signal based on the LTE support signal, and may decode the detected first downlink signal to acquire data included in the first downlink signal.

The second baseband processor 140 may be powered off when the first baseband processor 120 starts to perform an operation of detecting the first downlink signal. The second baseband processor 140 may store all information about 5G wireless communications in the second memory 190 before being powered off. Subsequently, the second baseband processor 140 may receive the 5G support signal from the first baseband processor 120, and may be powered on in response to the received 5G support signal. The second baseband processor 140 may read all information about 5G wireless communications from the second memory 190 to perform 5G wireless communications.

Figure 6:
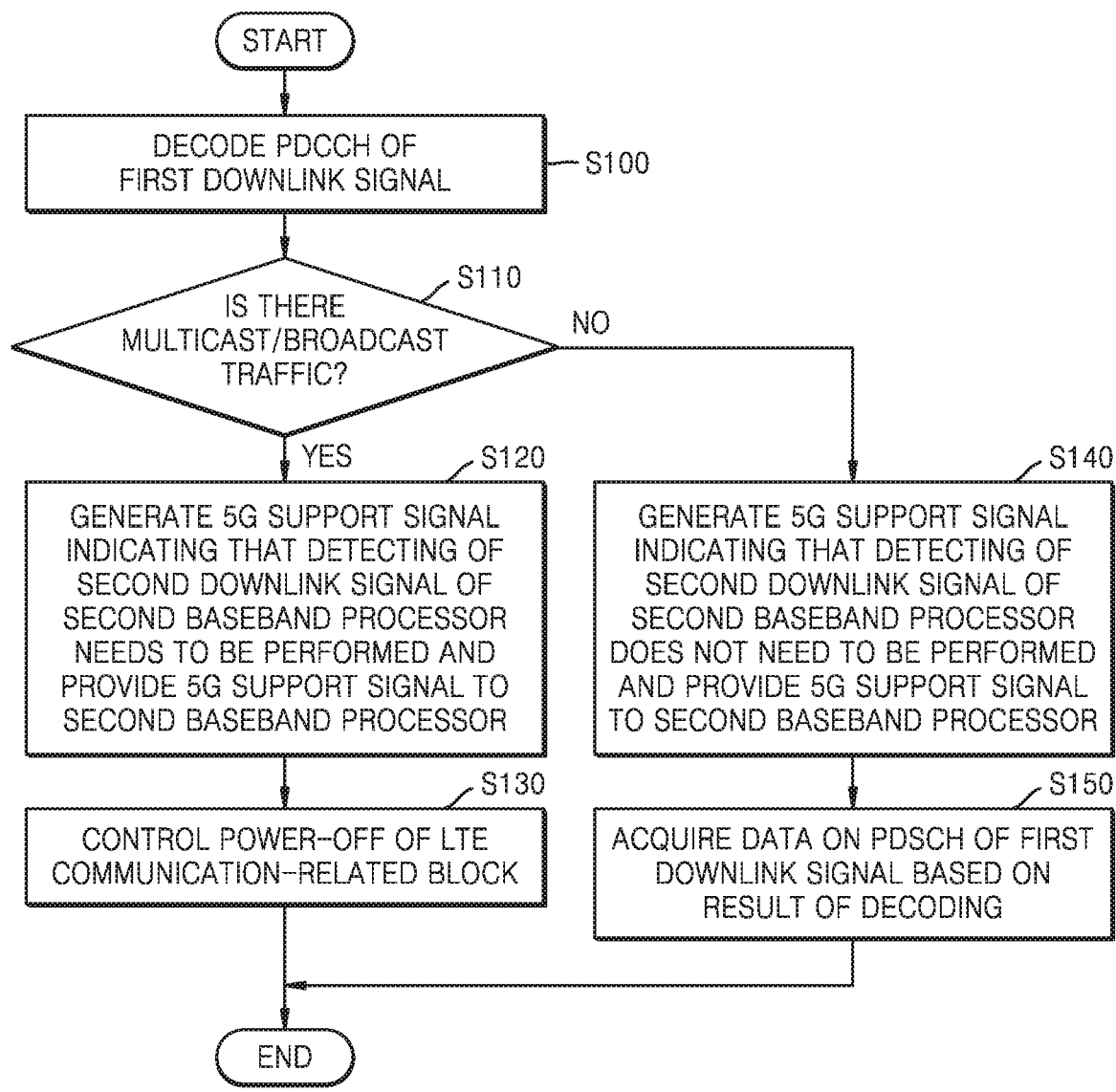
FIG. 6 is a flowchart illustrating a downlink-based wireless communication method for supporting a plurality of radio access technologies (RATs), according to an example embodiment of the inventive concepts.

FIG. 6 is a flowchart illustrating a downlink-based wireless communication method for supporting a plurality of RATs, according to an example embodiment of the inventive concepts. FIG. 6 is a flowchart illustrating an operation of the first baseband processor 23a of the wireless communication apparatus 20a of FIG. 1A.

Referring to FIGS. 1A and 6, a first baseband processor 23a may decode a PDCCH of the first downlink signal (Operation S100). The first baseband processor 23a may decode the PDCCH of the first downlink signal to determine whether there is multicast/broadcast traffic (Operation S110). For example, the first baseband processor 23a may receive an LTE-based upper layer signal to recognize the position of the MBSFN sub-frame, and may decode the PDCCH of the first downlink signal to determine whether there is a multicast/broadcast traffic within the MBSFN sub-frame. In an example, the first baseband processor 23a may decode the PDCCH of the first downlink signal using a multimedia broadcast multicast service (MBMS)-radio network temporary identifier (MBMS-RNTI), and determine whether there is a multicast/broadcast traffic, based on a result value of cyclic redundancy check (CRC) of the result of decoding.

In the case where the result of the decoding indicates that there is multicast/broadcast traffic (Operation S110, YES), the first baseband processor 23a may generate a 5G support signal for the second baseband processor 25a to detect a second downlink signal for 5G wireless communications thereof, and provide the 5G support signal to the second baseband processor 25a (Operation S120). Subsequently, the first baseband processor 23a may perform power-off with regard to an LTE communication-related block or an entirety of the first baseband processor 23a (Operation S130). The first baseband processor 23a may store all information about LTE wireless communications in the first memory 27a before performing power-off with regard to the LTE communication-related block.

In the case where the result of the decoding indicates that there is no multicast/broadcast traffic (S110, NO), the first baseband processor 23a may generate a 5G support signal for the second baseband processor 25a not to detect the second downlink signal for 5G wireless communications thereof, and provide the 5G support signal to the second baseband processor 25a (Operation S140). The first baseband processor 23a may acquire data on a PDSCH of the first downlink signal based on the result of decoding the PDCCH of the first downlink signal (Operation S150).

Figure 7A:
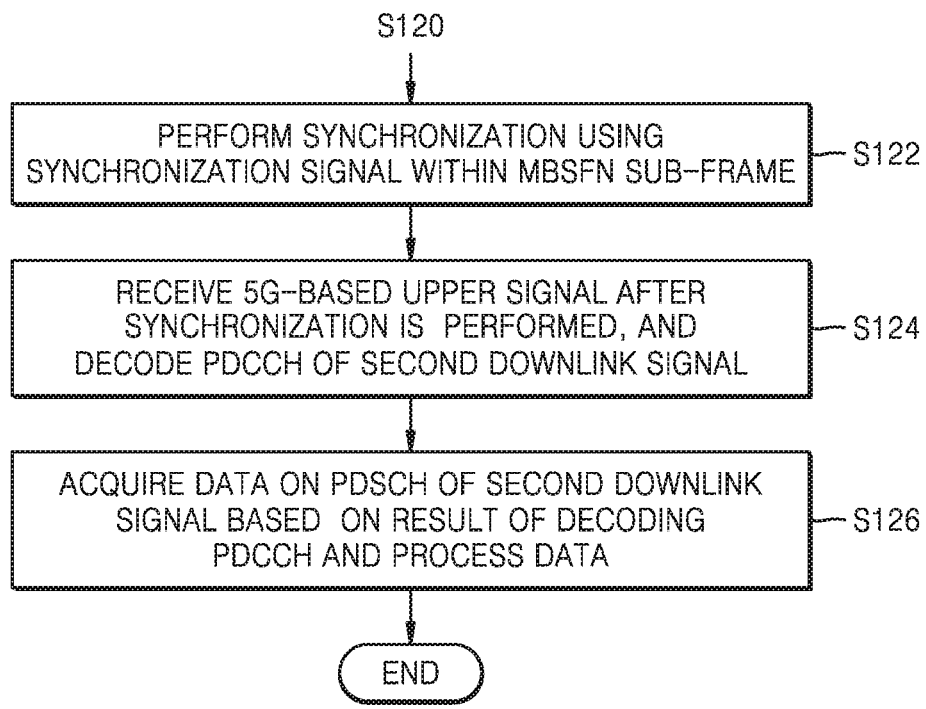
FIG. 7A is a flowchart illustrating an operation of a second baseband processor after Operation S120 of FIG. 6 is performed.
Figure 7B:
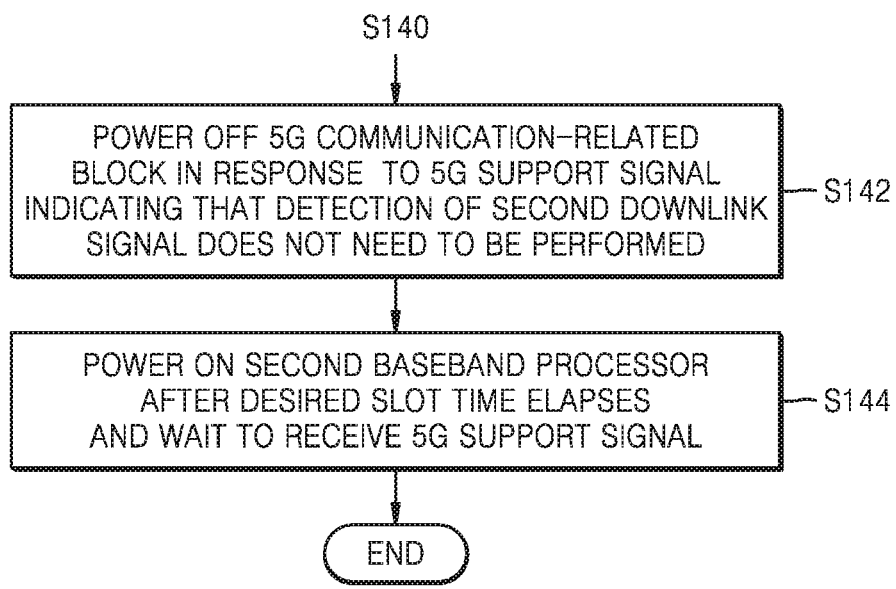
FIG. 7B is a flowchart illustrating an operation of a second baseband processor after Operation S140 of FIG. 6 is performed.

FIG. 7A is a flowchart illustrating an operation of the second baseband processor 25a after Operation S120 of FIG. 6 is performed. FIG. 7B is a flowchart illustrating an operation of the second baseband processor 25a after Operation S140 of FIG. 6 is performed.

Referring to FIGS. 1A and 7A, a 5G support signal may include position information about an MBSFN sub-frame, and the second baseband processor 25a may search for the MBSFN sub-frame and may perform synchronization using a synchronization signal (e.g., SS burst), which is included in the second downlink signal within the MBSFN sub-frame, based on the position information about the MBSFN sub-frame (Operation S122). After completing synchronization, the second baseband processor 25a may receive a 5G-based upper layer signal to acquire system information for 5G wireless communications. The second baseband processor 25a may search for a PDCCH of the second downlink signal and may perform decoding of the PDCCH of the second downlink signal based on the acquired system information (Operation S124). The second baseband processor 25a may acquire data on the PDSCH of the second downlink signal based on the result of decoding the PDCCH to process the data (Operation S126).

Referring to FIGS. 1A and 7B, the second baseband processor 25a may power off a 5G communication-related block or an entirety of the second baseband processor 25a in response to the 5G support signal indicating that detection of the second downlink signal does not need to be performed (Operation S142). The second baseband processor 25a may be powered on after a desired (or alternatively, predetermined) slot time elapses and may wait to receive the 5G support signal (Operation S144).

Figure 8A:
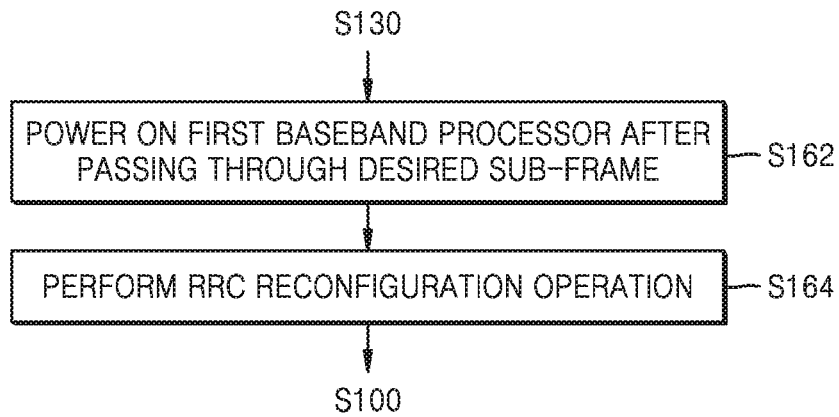
FIG. 8A is a flowchart illustrating an operation of a first baseband processor after Operation S130 of FIG. 6 is performed.
Figure 8B:
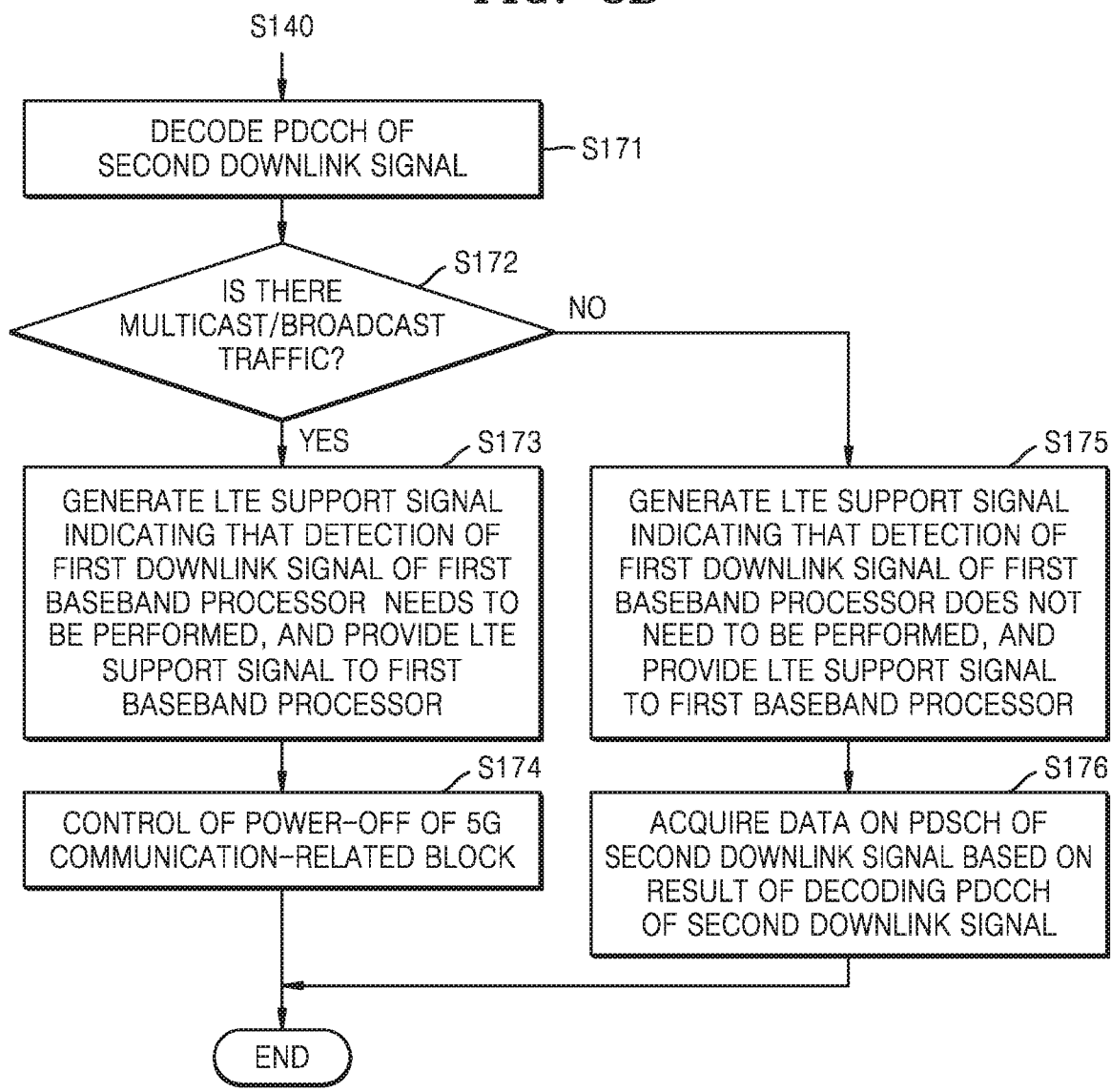
FIG. 8B is a flowchart illustrating an operation of the second baseband processor after Operation S140 of FIG. 6 is performed.

FIG. 8A is a flowchart illustrating an operation of the first baseband processor 23a after Operation S130 of FIG. 6 is performed. FIG. 8B is a flowchart illustrating an operation of the second baseband processor 25a after Operation S140 of FIG. 6 is performed.

Referring to FIGS. 1A and 8A, the first baseband processor 23a may be powered on by passing through a desired (or alternatively, predetermined sub-frame) after being powered off (Operation S162). When performing LTE wireless communications, the first baseband processor 23a may perform an RRC reconfiguration operation or an RRC connection operation using the information about LTE wireless communications stored in the first memory 27a (Operation S164).

Referring to FIGS. 1A and 8B, the second baseband processor 25a may decode a PDCCH of the second downlink signal (Operation S171). The second baseband processor 25a may decode the PDCCH of the second downlink signal to determine whether there is multicast/broadcast traffic (Operation S172). For example, the second baseband processor 25a may receive a 5G-based upper layer signal to recognize positions of slots corresponding to the MBSFN sub-frame, and may decode the PDCCH of the second downlink signal to determine whether there is the multicast/broadcast traffic within slots corresponding to the MBSFN sub-frame.

When there is the multicast/broadcast traffic (Operation S172, YES), the second baseband processor 25a may generate an LTE support signal indicating that detection of the first downlink signal for LTE wireless communications of the first baseband processor 23a needs to be performed, and may provide the LTE support signal to the first baseband processor 23a (Operation S173). Subsequently, the second baseband processor 25a may perform power-off with regard to a 5G communication-related block or an entirety of the second baseband processor 25a (Operation S174). The second baseband processor 25a may store all information about 5G wireless communications in the second memory 29a before performing power-off with regard to the 5G communication-related block.

When there is no multicast/broadcast traffic (Operation S172, NO), the second baseband processor 25a may generate an LTE support signal indicating detection of the first downlink signal for LTE wireless communications of the first baseband processor 23a does not need to be performed, and may provide the LTE support signal to the first baseband processor 23a (Operation S175). The second baseband processor 25a may acquire data on the PDSCH of the second downlink signal based on the result of decoding the PDCCH of the second downlink signal (Operation S176).

Figure 9:
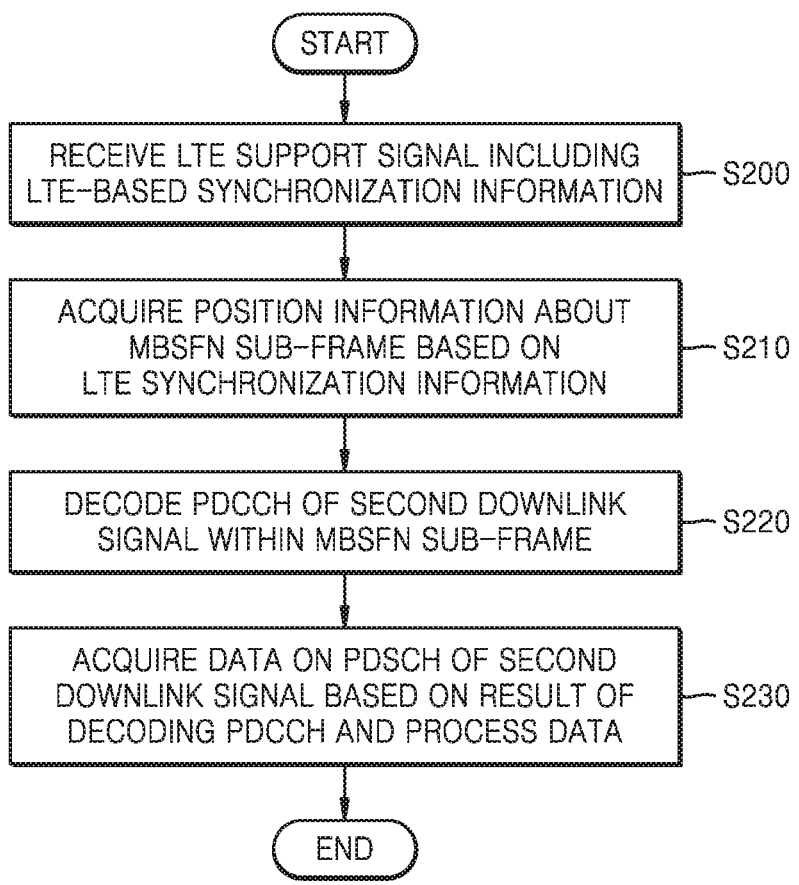
FIG. 9 is a flowchart illustrating a downlink-based wireless communication method of the second baseband processor of FIG. 1A, according to an example embodiment of the inventive concepts.

FIG. 9 is a flowchart illustrating a downlink-based wireless communication method of the second baseband processor 25a of FIG. 1A, according to an example embodiment of the inventive concepts.

Referring to FIGS. 1A and 9, in the case where the second downlink signal does not include an additional 5G-based upper layer signal, the second baseband processor 25a may receive an LTE support signal including LTE-based synchronization information from the first baseband processor 23a (Operation S200). The second baseband processor 25a may acquire position information about the MBSFN sub-frame in which second downlink signals may be arranged, based on LTE synchronization information (Operation S210). The second baseband processor 25a may firstly perform decoding on signals included in the MBSFN sub-frame. The second baseband processor 25a may decode a PDCCH of the second downlink signal within the MBSFN sub-frame (Operation S220). The second baseband processor 25a may acquire data on the PDSCH of the second downlink signal based on the result of decoding the PDCCH and may process the data (Operation S230).

Figure 10:
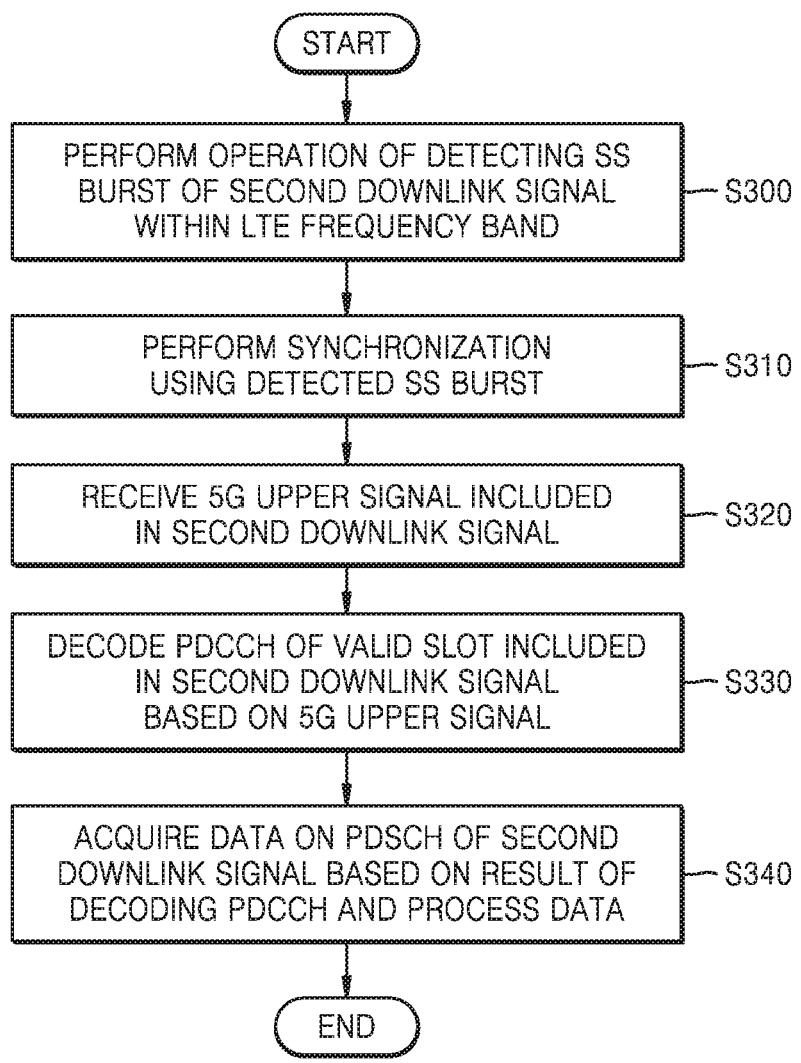
FIG. 10 is a flowchart illustrating a wireless communication method performed by the wireless communication apparatus of FIG. 1B, according to an example embodiment of the inventive concepts.
Figure 11:
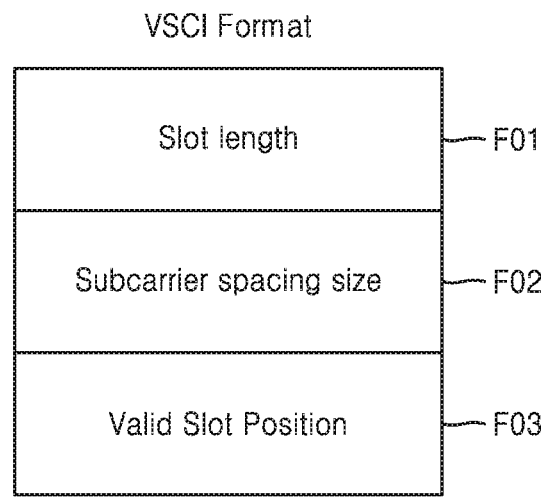
FIG. 11 is a view for explaining valid slot-related configuration information included in a 5G upper layer signal.

FIG. 10 is a flowchart illustrating a wireless communication method performed by the wireless communication apparatus 20b of FIG. 1B, according to an example embodiment of the inventive concepts. FIG. 11 is a view for explaining valid slot-related configuration information included in a 5G upper layer signal.

Referring to FIGS. 1B and 10, because the wireless communication apparatus 20b includes only the second baseband processor 25b for 5G wireless communications, the wireless communication apparatus 20b does not receive the 5G support signal. Thus, the second baseband processor 25b may perform an operation of detecting SS burst of the second downlink signal within an LTE frequency band LTE_BW (Operation S300). The second baseband processor 25b may perform synchronization with the BS 10b using the detected SS burst (Operation S310). The second baseband processor 25b may receive the 5G upper layer signal included in the second downlink signal (Operation S320). The second baseband processor 25b may decode a PDCCH of a valid slot included in the second downlink signal based on the 5G upper layer signal (Operation S330).

Referring further to FIG. 11, the 5G upper layer signal may be provided in a valid slot-related configuration information (VSCI) format. The VSCI format may include a slot length information-related field F01, a sub-carrier spacing size information-related field F02, and a valid slot position information-related field F03. However, the VSCI format illustrated in FIG. 11 is just an example embodiment. Thus, example embodiments are not limited thereto. For example, the VSCI format may further include various information-related fields.

Referring back to FIG. 10, the second baseband processor 25b may recognize a valid slot on which PDCCH decoding is performed based on the VSCI format, and the second baseband processor 25b may decode a PDCCH of the valid slot. The second baseband processor 25b may acquire data on the PDSCH of the second downlink signal based on the result of decoding the PDCCH and may process the data (Operation S340).

FIG. 12 is a flowchart illustrating an uplink-based wireless communication method for supporting a plurality of RATs, according to an example embodiment of the inventive concepts.

Referring to FIGS. 1A and 12, the wireless communication apparatus 20a may provide a scheduling request to the BS 10a to transmit a first uplink signal and a second uplink signal each including desired (or alternatively, predetermined) data via the LTE frequency band LTE_BW (Operation S400). The BS 10a may provide an uplink scheduling approval to the wireless communication apparatus 20a after allocating a frequency band through which each of the first uplink signal and the second uplink signal may be transmitted (Operation S420). The wireless communication apparatus 20a may transmit the first uplink signal to the BS 10a via a first frequency band allocated within the LTE frequency band and the second uplink signal to the BS 10a via a second frequency band allocated within the LTE frequency band LTE_BW in response to an uplink scheduling approval (Operation S440).

The BS 10a may allocate one or more frequency bands for the first uplink signal and the second uplink signal, as described above in FIGS. 3A through 3C, and the wireless communication apparatus 20a may perform uplink-based wireless communications to comply with the allocated one or more frequency bands.

Figure 13A:
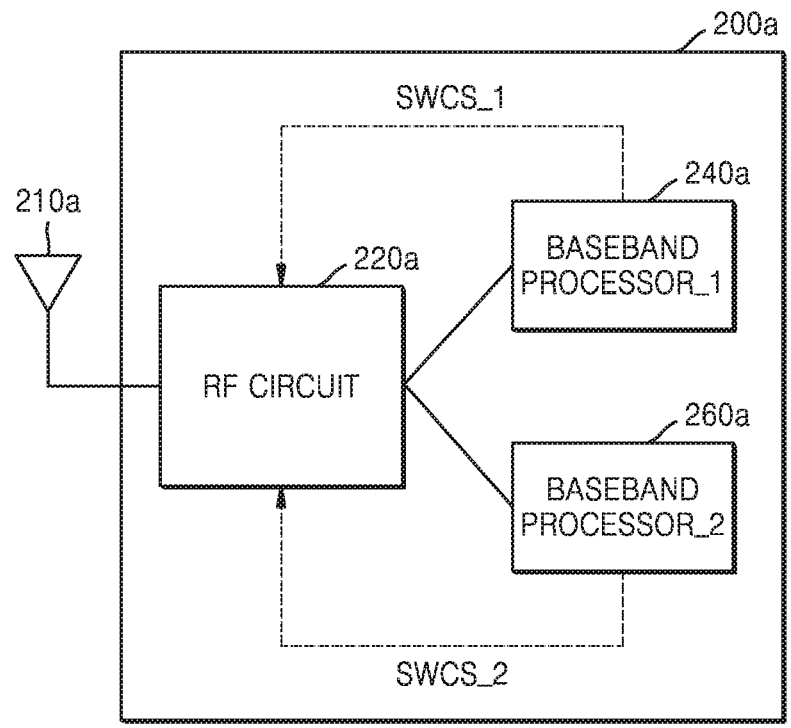
FIGS. 13A and 13B are block diagrams for explaining configurations of a wireless communication apparatuses according to some example embodiment of the inventive concepts.
Figure 13B:
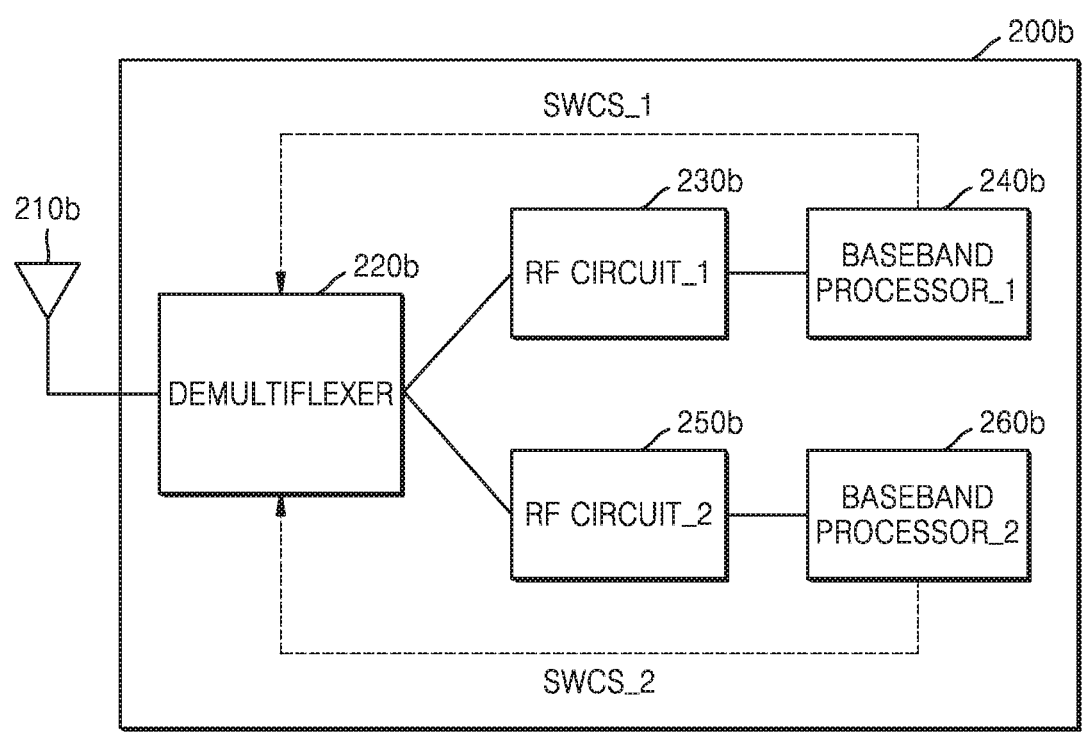

FIGS. 13A and 13B are block diagrams for explaining configurations of wireless communication apparatuses 200a and 200b according to some example embodiments of the inventive concepts.

Referring to FIG. 13A, the wireless communication apparatus 200a may include an antenna 210a, an RF circuit 220a, a first baseband processor 240a, and a second baseband processor 260a. In an example embodiment, the first baseband processor 240a and the second baseband processor 260a may generate a first switching control signal SWCS_1 and a second switching control signal SWCS_2, respectively, and provide the first switching control signal SWCS_1 and the second switching control signal SWCS_2 to the RF circuit 220a. The RF circuit 220a may include a demultiplexer (not shown), receive a downlink signal including at least one of the first downlink signal or the second downlink signal via the antenna 210a, selectively provide the first downlink signal to the first baseband processor 240a based on the first switching control signal SWCS_1, and selectively provide the second downlink signal to the second baseband processor 260a based on the second switching control signal SWCS_2.

In an example embodiment, the first baseband processor 240a may acquire reception patterns for the first downlink signal based on the result of decoding the first down link signal (e.g., the PDCCH of the LTE-based upper layer signal included in the first downlink signal). The first baseband processor 240a may generate the first switching control signal SWCS_1 based on the reception patterns for the first downlink signal. Also, the second baseband processor 260a may acquire reception patterns for the second downlink signal based on the result of decoding the second downlink signal (e.g., the PDCCH of the 5G-based upper layer signal in the second downlink signal). The second baseband processor 260a may generate the second switching control signal SWCS_2 based on the reception patterns for the second downlink signal.

Through the configuration of the wireless communication apparatus 200a, the RF circuit 220a may selectively provide each of the first downlink signal for LTE wireless communications and the second downlink signal for 5G wireless communications to respective appropriate baseband processors.

Also, the RF circuit 220a may further include a multiplexer (not shown), and selectively provide a first uplink signal generated from the first baseband processor 240a to a BS based on the first switching control signal SWCS_1 and a second uplink signal generated from the second baseband processor 260a to the BS based on the second switching control signal via the antenna 210a.

Referring to FIG. 13B, the wireless communication apparatus 200b may further include a demultiplexer 220b, which is implemented with an additional block, unlike in the wireless communication apparatus 200a of FIG. 13A, a first RF circuit 230b that is configured to receive the first downlink signal routed from the demultiplexer 220b, and a second RF circuit 250b that is configured to receive the second downlink signal routed from the demultiplexer 220b.

In an example embodiment, the first baseband processor 240b and the second baseband processor 260b may generate a first switching control signal SWCS_1 and a second switching control signal SWCS_2, respectively, and may provide the first switching control signal SWCS_1 and the second switching control signal SWCS_2 to the demultiplexer 220b. The demultiplexer 220b may route the first downlink signal to the first RF circuit 230b based on the first switching control signal SWCS_1 and may route the second downlink signal to the second RF circuit 250b based on the second switching control signal SWCS_2.

The first RF circuit 230b may convert the first downlink signal into a first baseband signal, and provide the first baseband signal to the first baseband processor 240b. The first baseband processor 240b may process the first baseband signal. The second RF circuit 250b may convert the second downlink signal into a second baseband signal, and provide the second baseband signal to the second baseband processor 260b. The second baseband processor 260b may process the second baseband signal.

The wireless communication apparatus 200b may further include a multiplexer implemented with an additional block and may perform uplink-based wireless communications using the multiplexer. A description thereof has been provided with reference to FIG. 13A and thus will now be omitted.

Figure 14:
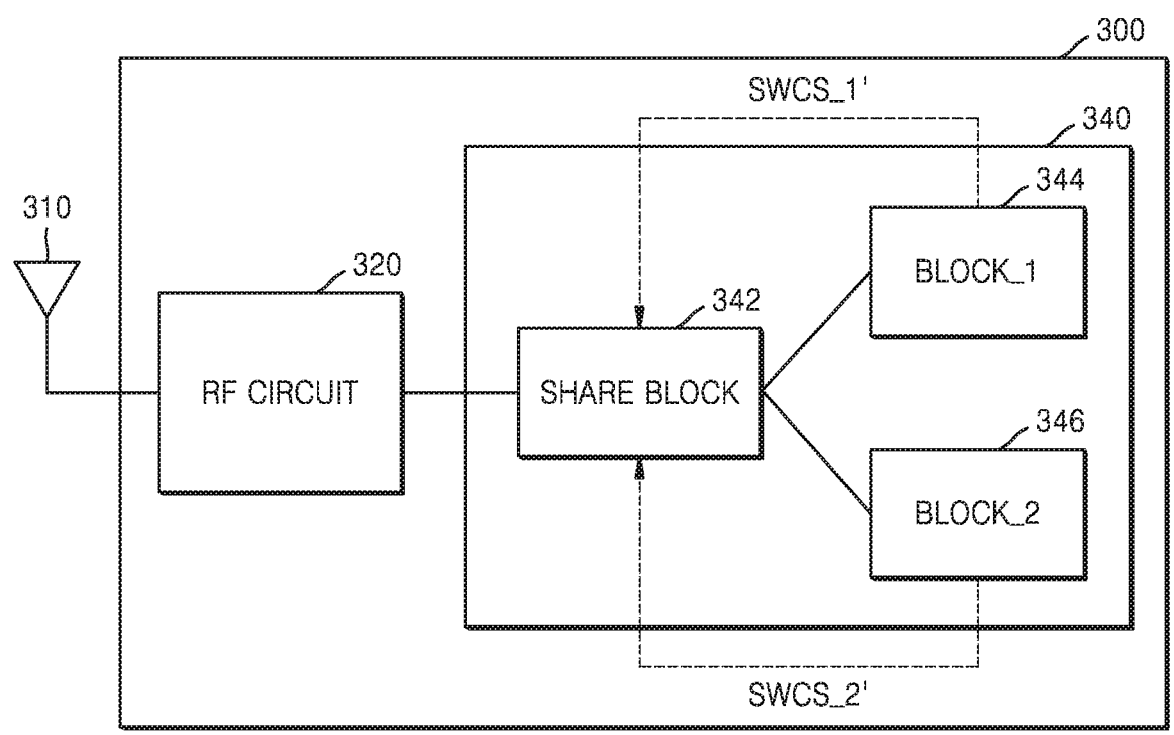
FIG. 14 is a block diagram for explaining a configuration of a wireless communication apparatus according to an example embodiment of the inventive concepts.

FIG. 14 is a block diagram for explaining a configuration of a wireless communication apparatus 300 according to an example embodiment of the inventive concepts.

Referring to FIG. 14, the wireless communication apparatus 300 may include an antenna 310, an RF circuit 320, and a baseband module 340. The baseband module 340 may include a share block 342, a first block 344 for LTE wireless communications, and a second block 346 for 5G wireless communications. The RF circuit 320 may receive a downlink signal including at least one of a first downlink signal or a second downlink signal via the antenna 310. The RF circuit 320 may convert the first downlink signal into a first baseband signal and the second downlink signal into a second baseband signal.

The share block 342 may include a filter for filtering an undesirable frequency band of the baseband signal received from the RF circuit 320, an automatic gain controller (AGC) that is configured to adjust an amplitude of the baseband signal, and an automatic frequency controller (AFC) that is configured to correct frequency mismatch that may occur after sampling is performed. Furthermore, the share block 342 may further include a register in which commands desired for an operation of the share block 342 are stored.

In an example embodiment, in the case where the size of sub-carrier spacing in 5G wireless communications, for example, 15 kHz, is the same as the fixed size of sub-carrier spacing in LTE wireless communications, for example, 15 kHz, the share block 342 may further include a fast Fourier transform (FFT) sub-block that may be shared by the first block 344 and the second block 346. However, in the case where the size of sub-carrier spacing in 5G wireless communications, for example, 30 kHz, is different from the fixed size of sub-carrier spacing in LTE wireless communications, for example, 15 kHz, the second block 346 may further include a sub-block that converts a signal received from the share block 342 into a signal that satisfies the size of sub-carrier spacing in 5G wireless communications.

The first block 344 and the second block 346 may generate a first switching control signal SWCS_1' and a second switching control signal SWCS_2', respectively, and provide the first switching control signal SWCS_1' and the second switching control signal SWCS_2' to the share block 342. The share block 342 may route a first baseband signal to the first block 344 based on the first switching control signal SWCS_1', and route a second baseband signal to the second block 346 based on the second switching control signal SWCS_2'.

Figure 15A:
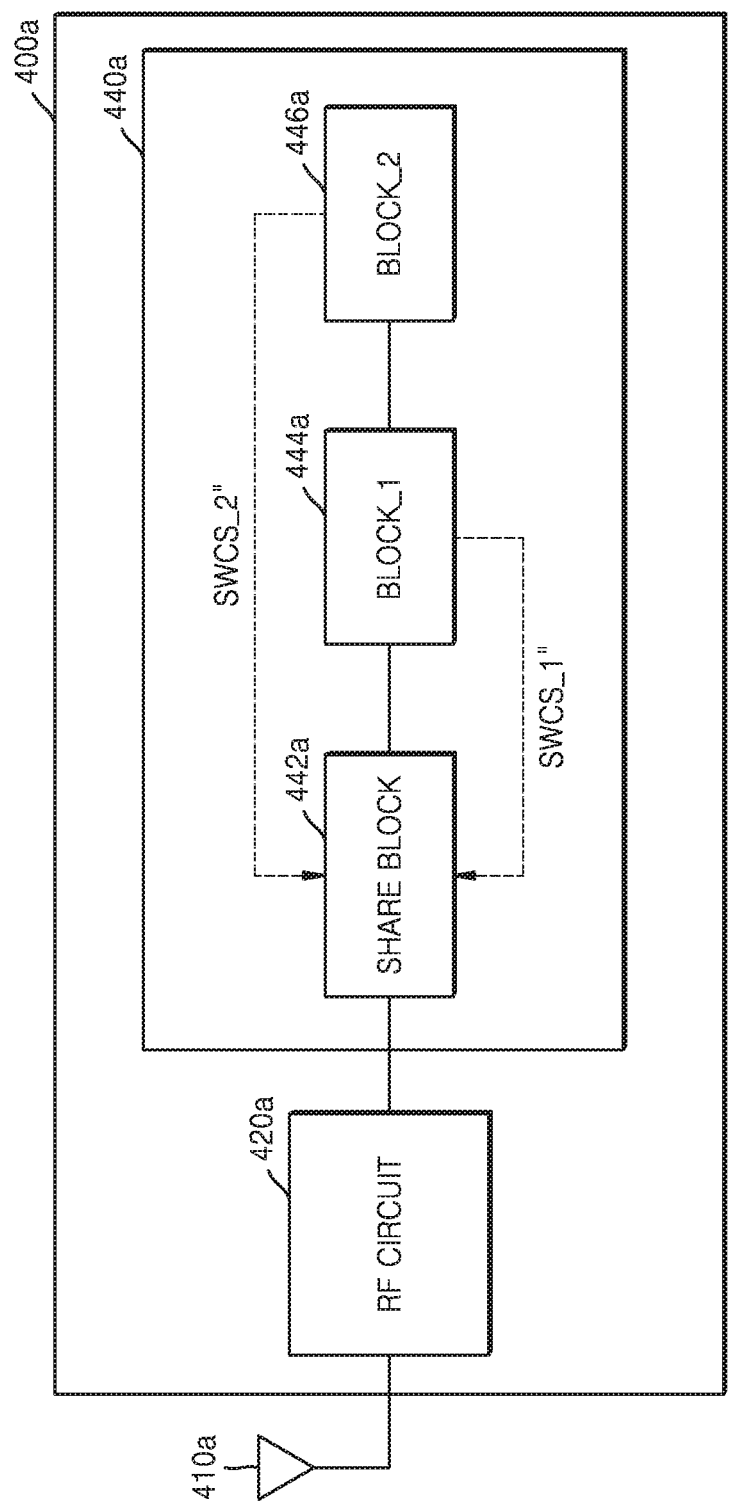
FIGS. 15A and 15B are block diagrams for explaining configurations of a wireless communication apparatuses according to some example embodiments of the inventive concepts.

FIG. 15A is a block diagram for explaining configurations of wireless communication apparatuses 400a and 400b according to some example embodiment of the inventive concepts.

Referring to FIG. 15A, unlike in the baseband module 340 of FIG. 14, a share block 442a, a first block 444a, and a second block 446a of the baseband module 440a of FIG. 15A may be sequentially or serially connected. That is, the first block 444a may firstly perform LTE wireless communications using a first downlink signal, and the second block 446a may subsequently perform 5G wireless communications using a second downlink signal according to the result of decoding the first downlink signal. The first block 444a and the second block 446a may generate a first switching control signal SWCS_1" and a second switching control signal SWCS_2" and provide the first switching control signal SWCS_1" and the second switching control signal SWCS_2" to the share block 442a. The share block 442a may provide a first baseband signal (that corresponds to the first downlink signal) to the first block 444a to firstly perform LTE wireless communications based on the first switching control signal SWCS_1", and provide a second baseband signal (that corresponds to the second downlink signal) to the second block 446a to subsequently perform 5G wireless communications based on the second switching control signal SWCS_2".

Figure 15B:
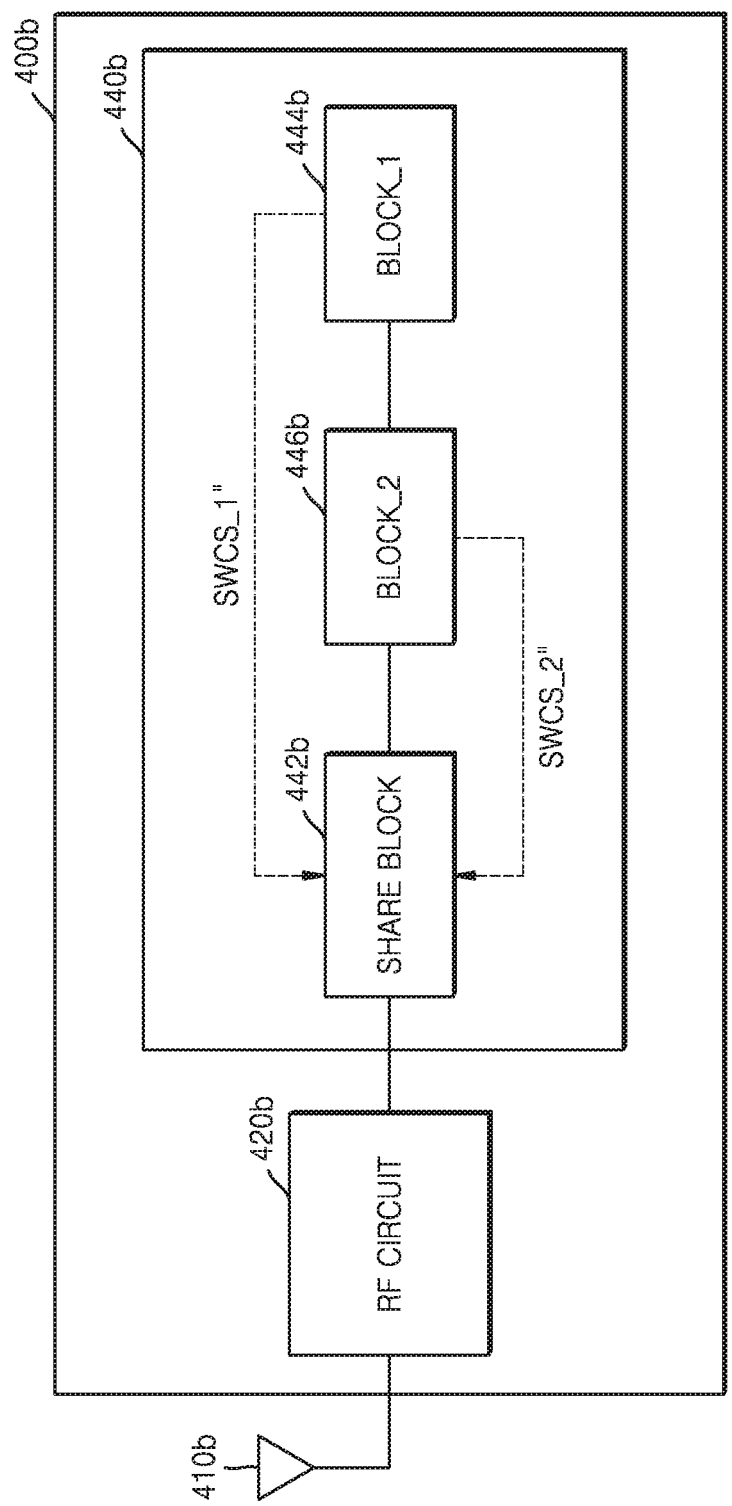

Referring to FIG. 15B, a share block 442b, a second block 446b, and a first block 444b of a baseband module 440b may be sequentially or serially connected. That is, the second block 446b may firstly perform 5G wireless communications using a second downlink signal, and the first block 444b may subsequently perform LTE wireless communications using a first downlink signal according to the result of decoding the second downlink signal. The second block 446b and the first block 444b may generate a second switching control signal SWCS_2" and a first switching control signal SWCS_1", respectively, and provide the second switching control signal SWCS_2" and the first switching control signal SWCS_1" to the share block 442b. The share block 442b may provide a second baseband signal (that corresponds to a second downlink signal) to the second block 446b to firstly perform 5G wireless communications based on the second switching control signal SWCS_2", and provide a first baseband signal (that corresponds to a first downlink signal) to the first block 444b to subsequently perform LTE wireless communications based on the first switching control signal SWCS_1".

Figure 16:
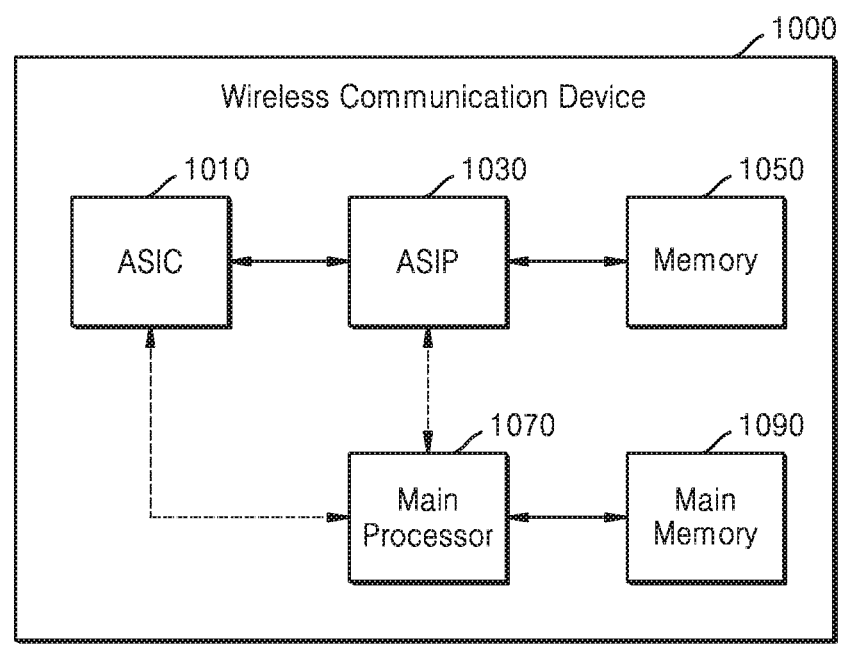
FIG. 16 is a schematic block diagram of a wireless communication apparatus according to an example embodiment of the inventive concepts.

FIG. 16 is a schematic block diagram of a wireless communication apparatus 1000 according to an example embodiment of the inventive concepts.

Referring to FIG. 16, the wireless communication apparatus 1000 may include an application specific integrated circuit (ASIC) 1010, an application specific instruction set processor (ASIP) 1030, memory 1050, a main processor 1070, and main memory 1090. Two or more among the ASIC 1010, the ASIP 1030, and the main processor 1070 may communicate with each other. Also, at least two or more among the ASIC 1010, the ASIP 1030, the memory 1050, the main processor 1070, and the main memory 1090 may be embedded in one chip.

The ASIP 1030 that is an integrated circuit (IC) customized for a specific purpose may support an exclusive instruction set for a certain application, and execute instructions included in the instruction set. The memory 1050 may communicate with the ASIP 1030, and store a plurality of instructions executed by the ASIP 1030. The memory 1050 may be a non-temporary storage device. For example, as non-limiting examples, the memory 1050 may include an arbitrary type of memory accessible by the ASIP 1030, for example, random access memory (RAM), read only memory (ROM), a tape, a magnetic disk, an optical disk, volatile memory, non-volatile memory, or a combination thereof.

The main processor 1070 may control the wireless communication apparatus 20 by executing a plurality of instructions. For example, the main processor 1070 may control the ASIC 1010 and the ASIP 1030, process data received via a wireless communication network, and/or process user's input for the wireless communication apparatus 1000. The main memory 1090 may communicate with the main processor 1070, and store a plurality of instructions executed by the main processor 1070, as a non-temporary storage device. For example, as non-limiting examples, the main memory 1090 may include an arbitrary type of memory accessible by the main processor 1070, for example, RAM, ROM, a tape, a magnetic disk, an optical disk, volatile memory, non-volatile memory, or a combination thereof.

Wireless communication methods according to some example embodiments of the inventive concepts can be implemented by at least one among elements included in the wireless communication apparatus 1000 of FIG. 16. In some example embodiments, at least one among the above-described operations of the wireless communication method can be implemented with a plurality of instructions stored in the memory 1050. In some example embodiments, the ASIP 1030 executes the plurality of instructions stored in the memory 1050 so that at least one among the operations of the wireless communication method can be performed. In some example embodiments, at least one among the operations of the wireless communication method can be implemented with a hardware block designed through logic synthesis, and can also be included in the ASIC 1010. In some example embodiments, at least one among the operations of the wireless communication method can be implemented with a plurality of instructions stored in the main memory 1090, and the main processor 1070 can execute the plurality of instructions stored in the main memory 1090 so that at least one among the operations of the wireless communication method can be performed.

In wireless communication methods and/or wireless communication apparatuses according to some example embodiments of the inventive concepts, baseband processors included in the wireless communication apparatus can decode downlink signals corresponding to heterogeneous RATs and can generate support signals based on the result of decoding to provide the support signals to each other so that a plurality of RATs can be efficiently supported. Thus, the wireless communication apparatus can provide various communication services to the user so that user convenience can be increased and a limited frequency band can be efficiently used.

The effects that can be attained in example embodiments of the inventive concepts are not limited to the above-described effects, and other unmentioned effects can be clearly drawn and understood by those skilled in the art from the following description. That is, unmentioned effects attained by implementation of the example embodiments of the inventive concepts can also be drawn by those skilled in the art to which the example embodiments of the inventive concepts pertain.

While the inventive concept have been particularly shown and described with reference to some example embodiments thereof, it will be understood that various changes in form and details may be made therein without departing from the spirit and scope of the following claims.

What is claimed is:

1. A wireless communication method of a wireless communication apparatus for supporting a plurality of radio access technologies (RATs), the wireless communication method comprising:
    receiving, by a wireless communication apparatus, a first downlink signal from a base station operated on a first RAT;
    decoding, by the wireless communication apparatus, the first downlink signal;
    detecting, by the wireless communication apparatus, a second downlink signal corresponding to a second RAT based on a result of the decoding the first downlink signal; and
    decoding, by a wireless communication apparatus, the detected second downlink signal to acquire data related to the second downlink signal,
    wherein the result of the decoding the first downlink signal comprises information regarding whether there is multicast traffic or not, and
    the detecting comprises determining whether to perform the detecting based on the information and detecting the second downlink signal in response to the information indicating that there is no multicast traffic.

2. The wireless communication method of claim 1, wherein the first RAT comprises long term evolution (LTE) radio access technology, and the second RAT comprises $5^{th}$ generation (5G) radio access technology.

3. The wireless communication method of claim 1, wherein the detecting comprises:
    determining whether to detect the second downlink signal based on the result of the decoding the first downlink signal;
    performing synchronization with the base station to which the second RAT is applied using synchronization signal (SS) burst included in the second downlink signal in a sub-frame indicated by the first downlink signal;
    acquiring an system information about a target sub-frame included in the second downlink signal after the synchronization is completed; and
    detecting a physical downlink control channel (PDCCH) according to the second RAT from the target sub-frame.

4. The wireless communication method of claim 3, wherein the decoding comprises:
    detecting a physical downlink share channel (PDSCH) of at least part of the second downlink signal by decoding the detected PDCCH according to the second RAT; and
    acquiring the data by decoding the detected PDSCH according to the second RAT.

5. A wireless communication method comprising:
    receiving, by a wireless communication apparatus, a first downlink signal from a base station through a first frequency band, the first downlink signal corresponding to a first radio access technology (RAT), the first frequency band comprising a second frequency band allocated for transmission of a second downlink signal corresponding to a second RAT;
    detecting, by the wireless communication apparatus, a target slot on the second frequency band based on the first downlink signal;
    performing, by the wireless communication apparatus, synchronization with the base station by acquiring synchronization signal (SS) burst on the target slot;
    detecting, by the wireless communication apparatus, the second downlink signal based on the synchronization signal (SS) burst after the synchronization is completed; and
    decoding, by the wireless communication apparatus, the second downlink signal to acquire an upper layer signal included in the second downlink signal.

6. The wireless communication method of claim 5, wherein
    the first downlink signal comprises valid slot-related configuration information, the valid slot-related configuration information including at least one from among a slot length information, sub-carrier spacing (SCS) information, or position information about a valid slot.

7. The wireless communication method of claim 5, wherein
    the detecting comprises detecting a physical downlink control channel (PDCCH) of the second downlink signal, and
    the decoding comprises,
        detecting a physical downlink share channel (PDSCH) of the second downlink signal by decoding the detected PDCCH, and
        acquiring data by decoding the detected PDSCH.

8. A wireless communication apparatus comprising:
    a radio frequency (RF) circuit configured to receive a downlink signal, the downlink signal including at least one of a first downlink signal corresponding to first radio access technology (RAT) or a second downlink signal corresponding to a second RAT through a first frequency band;
    a first baseband processor configured to process the first downlink signal; and
    a second baseband processor configured to process the second downlink signal, the second baseband processor further configured to perform an operation based on a result of decoding the first downlink signal of the first baseband processor,
    wherein the second baseband processor is further configured to detect the second downlink signal in response to the result of decoding the first downlink signal indicating that there is no multicast traffic.

9. The wireless communication apparatus of claim 8, wherein the second baseband processor is further configured to be powered off in response to the result of decoding the first downlink signal indicating that there is a multicast traffic.

10. The wireless communication apparatus of claim 8, wherein the second baseband processor is further configured to detect the second downlink signal based on the result of decoding the first downlink signal, and acquire an upper layer signal from the second downlink signal detected.

11. The wireless communication apparatus of claim 10, wherein
the RF circuit comprises a demultiplexer, the demultiplexer configured to route the downlink signal to the first baseband processor or the second baseband processor, and
the second baseband processor is configured to generate a control signal for selectively receiving the second downlink signal based on the upper layer signal and provide the control signal to the demultiplexer.

12. The wireless communication apparatus of claim 8, wherein the first RAT is long term evolution (LTE) radio access technology, and the second RAT is $5^{th}$ generation (5G) radio access technology.

13. The wireless communication apparatus of claim 8, wherein
the first baseband processor is further configured to transmit a first uplink signal to a base station through a first band within a second frequency band, and
the second baseband processor is further configured to transmit a second uplink signal to the base station through a second band within the second frequency band.

14. The wireless communication method of claim 1, wherein the second downlink signal includes at least one of a physical downlink control channel (PDCCH) signal corresponding to the second RAT or a synchronization signal corresponding to the second RAT.

15. The wireless communication method of claim 14, wherein the synchronization signal corresponding to the second RAT includes at least one of a primary synchronization signal (PSS), a secondary synchronization signal (SSS), or a physical broadcasting channel signal (PBCHS), corresponding to the second RAT.

* * * * *